US012331589B2

(12) United States Patent
Rieper et al.

(10) Patent No.: US 12,331,589 B2
(45) Date of Patent: *Jun. 17, 2025

(54) POSITION DETECTION IN AN ELECTRIC DRIVE UNIT FOR CORDS OF BLINDS

(71) Applicant: Hunter Douglas Industries B.V., Rotterdam (NL)

(72) Inventors: Norbert Rieper, Rotterdam (NL); Heiko Lilienthal, Rotterdam (NL)

(73) Assignee: Hunter Douglas Industries B.V., Rotterdam (NL)

( * ) Notice: Subject to any disclaimer, the term of this patent is extended or adjusted under 35 U.S.C. 154(b) by 748 days.

This patent is subject to a terminal disclaimer.

(21) Appl. No.: 17/246,183

(22) Filed: Apr. 30, 2021

(65) Prior Publication Data

US 2021/0254402 A1    Aug. 19, 2021

Related U.S. Application Data

(63) Continuation of application No. 15/757,615, filed as application No. PCT/EP2016/070833 on Sep. 5, 2016, now Pat. No. 11,035,172.

(30) Foreign Application Priority Data

Sep. 4, 2015  (NL) .................................... 1041462

(51) Int. Cl.
*E06B 9/68*  (2006.01)
*E06B 9/32*  (2006.01)
(Continued)

(52) U.S. Cl.
CPC ................. *E06B 9/70* (2013.01); *E06B 9/32* (2013.01); *E06B 9/322* (2013.01); *E06B 9/68* (2013.01);
(Continued)

(58) Field of Classification Search
CPC .... E06B 9/32; E06B 9/322; E06B 2009/3222; E06B 9/68; E06B 9/70; E06B 2009/6872; E06B 2009/6854
See application file for complete search history.

(56) References Cited

U.S. PATENT DOCUMENTS 5,170,108 A    12/1992  Peterson
5,178,200 A     1/1993  Hagen
(Continued)

FOREIGN PATENT DOCUMENTS

DE    102008050714 A1    4/2010
WO      2014143867 A1    9/2014
WO      2017037281 A1    3/2017

OTHER PUBLICATIONS

International Search Report and Written Opinion mailed Nov. 22, 2016 in related application No. PCT/EP2016/070833, all pgs.
(Continued)

*Primary Examiner* — Abe Massad
(74) *Attorney, Agent, or Firm* — Kilpatrick Townsend & Stockton LLP

(57) ABSTRACT

Techniques including winding, by using an electric motor of the architectural covering, a blind of the architectural covering in a first direction. The techniques further include stopping the winding by the electric motor of the blind in the first direction at a programmatically adjustable wound end position. The techniques further include upon the blind reaching the programmatically adjustable wound end position, winding, by using the electric motor, the blind in an opposite direction to a second position relaxing at least a cord of the blind that is wound by a cord winding/unwinding unit driven by the electric motor, the difference between the programmatically adjustable wound end position and the second position being an amount less than that which would (Continued)

result in movement of the blind to a fully extended position and set based on a length of the blind.

20 Claims, 8 Drawing Sheets

(51) Int. Cl.
    *E06B 9/322*     (2006.01)
    *E06B 9/70*     (2006.01)

(52) U.S. Cl.
    CPC ............... *E06B 2009/3222* (2013.01); *E06B 2009/6872* (2013.01); *G05B 2219/2653* (2013.01)

(56) References Cited

U.S. PATENT DOCUMENTS

| | | |
|---|---|---|
| 6,060,852 A | 5/2000 | Domel et al. |
| 6,100,659 A | 8/2000 | Will et al. |
| 6,936,987 B2 | 8/2005 | Cheron |
| 8,008,883 B2 | 8/2011 | Hoff |
| 8,368,335 B2 | 2/2013 | Feldstein et al. |
| 8,461,784 B2 | 6/2013 | Skinner |
| 8,723,454 B2 | 5/2014 | Skinner |
| 9,970,234 B2 * | 5/2018 | Derk, Jr. .................. E06B 9/72 |
| 11,035,172 B2 | 6/2021 | Rieper et al. |
| 2005/0039865 A1 | 2/2005 | Bruno et al. |
| 2009/0115366 A1 | 5/2009 | Mullet et al. |
| 2010/0018654 A1 | 1/2010 | Skinner et al. |
| 2011/0048651 A1 | 3/2011 | Goth |
| 2015/0034257 A1 | 2/2015 | Blair |
| 2015/0275574 A1 * | 10/2015 | Derk, Jr. .................. E06B 9/72 160/1 |

OTHER PUBLICATIONS

Notice Allowance mailed Feb. 18, 2021 in related U.S. Appl. No. 15/757,515, all pgs.

* cited by examiner

POSITION DETECTION IN AN ELECTRIC DRIVE UNIT FOR CORDS OF BLINDS

CROSS-REFERENCE TO RELATED APPLICATIONS

This application is a continuation of U.S. application Ser. No. 15/757,615, filed on Mar. 5, 2018, which is a § 371 National Stage of PCT Application No. PCT/EP2016/070833, filed on Sep. 5, 2016, which claims priority to Netherlands Patent Application No. NL1041462, filed Sep. 4, 2015 and published as Netherlands Patent Publication No. NL1041462, the disclosures of which are incorporated by reference herein in their entireties.

FIELD OF THE INVENTION

The present invention is in the field of blinds being electrically opened/closed, such as e.g. blinds for covering a window in order to provide a protection against sunlight. Especially, the present invention relates to an electric drive unit for cords of blinds, a system comprising such an electric drive unit and a method for operating such an electric drive unit.

Background and Object of the Invention

According to the state of the art, e.g. the document U.S. Pat. No. 6,936,987 B2, an electric drive unit is known that comprises a DC driven electric motor for driving a cord winding/unwinding unit for winding/unwinding cords of a blind. The upper end position respectively wound up end position of the cords of the blind is set by mechanical means, such as an abutment, at the top panel respectively header panel comprising the electric motor and the cord winding/unwinding unit. The cord winding/unwinding unit is arranged for winding/unwinding the cords of the blind.

The wound up end position of the cords of the blind corresponds to the upper end position at which the cords of the blind are wounded up by the electric motor, i.e. at which the blind is opened respectively lifted. When winding up the cords of the blind, i.e. opening or lifting the blind, the blind hits or strikes against the mechanical means at the time of reaching the wound up end position. As a result thereof, the current, which is taken up by the electric motor, increases. This increase of current is detected by a control unit, which stops the electric motor winding up the cords of the blind, regardless of whether a DC voltage is still supplied to the electric motor or not.

Thus, according to the state of the art, for changing the wound up end position it is necessary to change at the header panel the relative position of the mechanical means.

Furthermore, the blind being lifted reaches the wound up end position defined by the mechanical means at the header panel with an increased torque, wherein the blind hits or strikes against the mechanical means. This stresses the cords of the blind as well as the mechanical means, the header panel and the blind, which mechanically interact with each other. Over a long time period this stress can cause in particular a weakening of the cords of the blind, as the cords of the blind are always stressed with this high torque at the same position when winding up the cords of the blind respectively lifting the blind to the wound up end position defined by the mechanical means.

In view of the above, it is an object of the present invention to propose an electric drive unit for cords of blinds which can overcome these problems. That is, to propose an electric drive unit for cords of blinds that can easily change the wound up end position and reduce the stress on the cords of blinds when winding/unwinding the cords of blinds.

This object is achieved by an electric drive unit for cords of blinds, a system comprising such an electric drive unit and a method for operating such an electric drive unit according to the independent claims. Advantageous further developments are as set out in dependent claims.

DESCRIPTION OF THE INVENTION

According to one aspect of the invention an electric drive unit for cords of blinds is proposed, wherein the electric drive unit comprises:
 a DC driven electric motor,
 a cord winding/unwinding unit driven by the electric motor, for winding/unwinding one or more cords of a blind,
 a control circuitry arranged for controlling the operation of the electric motor by controlling the DC supply of the electric motor, the control circuitry being functionally connected to one or more rotation detection sensors, each rotation detection sensor being arranged for detecting increments of the rotation of the electric motor by cooperating with a rotating element driven by the electric motor, the rotating element having at least two discrete elements,
wherein the passage of which is detected as detection pulses by the one or more rotation detection sensor, characterized in that the control circuitry is arranged for controlling the electric motor dependent on the time development of the detected passages.

The control circuitry may be arranged for comparing characteristics (pulse width and/or number of pluses in a defined time window) of one or more passages of different, preferably subsequent, time periods.

This electric drive unit is advantageous, as no mechanical means are needed for defining a wound up end position. Thus, the wound up end position can easily be changed or adapted and the cords of the blind may be wounded up or the blind may be lifted to the wound up end position without a high stress on the cords of the blind caused by a high torque, when reaching the wound up end position.

Furthermore, the control circuitry may be arranged for determining the position of the electric motor corresponding to the position of the one or more cords of the blind by counting the number of detection pulses.

In addition, the control circuitry may be functionally connected to at least two rotation detection sensors, and the control circuitry may be arranged for detecting the direction of the rotation of the electric motor by evaluating the time development, such as e.g. the phase shift of the detection pulses of the two rotation detection sensors.

Moreover, the control circuitry may be arranged for stopping the operation of the electric motor in case the time development of the detected passages indicates a defined reduction of the speed of rotation of the electric motor.

Furthermore, the control circuitry may be arranged for determining the speed of rotation of the electric motor by determining the number of detection pulses and/or the pulse width of at least one detection pulse during a time window of defined length, such as e.g. 50 ms.

In addition, the control circuitry may be arranged for determining an acceleration or deceleration of rotation of the electric motor by determining the number of detection pulses and/or the pulse width of at least one detection pulse during a first time window of defined length, such as e.g. 50 ms, and the number of detection pulses and/or the pulse width of at least one detection pulse during a second time window of the same length as the first time window, wherein a defined difference in the determination results indicates an acceleration or deceleration of rotation of the electric motor.

Moreover, the control circuitry may be arranged for determining an acceleration or deceleration of rotation of the electric motor by repeatedly determining the number of detection pulses and/or the pulse width of at least one detection pulse during time windows of defined length, such as e.g. 50 ms, with a defined time period, such as e.g. 200 ms, between one time window and a successive time window, wherein a defined difference between the determination result of the one time window and the determination result of the successive time window indicates an acceleration or deceleration of rotation of the electric motor.

Furthermore, for winding the one or more cords of the blind up to a defined wound up end position, the control circuitry may be arranged for controlling the electric motor, such that:
 the electric motor drives the cord winding/unwinding unit to wind up the one or more cords of the blind, and
 the electric motor stops the cord winding/unwinding unit winding up the one or more cords of the blind at the defined wound up end position and then drives the cord winding/unwinding unit to turn in the opposite direction in order to relax the one or more cords of the blind, or
 the electric motor stops the cord winding/unwinding unit winding up the one or more cords of the blind at a position, which is a defined number of detection pulses, such as e.g. 50 detection pulses, away from the defined wound up end position.

In addition, for winding the one or more cords of the blind up to a defined wound up end position, the control circuitry may be arranged for controlling the electric motor, such that the electric motor stops the cord winding/unwinding unit winding up the one or more cords of the blind in case the control circuitry determines a defined reduction of the speed of rotation of the electric motor.

Further, for winding the one or more cords of the blind up to a defined wound up end position, the control circuitry may be arranged for controlling the electric motor, such that after a defined time period the electric motor stops the cord winding/unwinding unit winding up the one or more cords of the blind.

Moreover, for winding or unwinding the one or more cords of the blind, the control circuitry may be arranged for controlling the electric motor, such that
 the electric motor accelerates from a rest position to a first speed,
 the electric motor then drives the cord winding/unwinding unit at the first speed for a defined time period,
 the electric motor then accelerates to a second speed, and
 the electric motor then drives the cord winding/unwinding unit at the second speed until the control circuitry controls the electric motor to stop.

Furthermore, for winding up the one or more cords of the blind, the control circuitry may be arranged for controlling the electric motor, such that
 the electric motor drives the cord winding/unwinding unit to wind up the one or more cords of the blind, and
 the electric motor stops the cord winding/unwinding unit winding up the one or more cords of the blind in case the control circuitry determines a defined reduction of the speed of rotation of the electric motor and/or after a defined time period.

In addition, the blind may be a tensioned blind and, for winding up the one or more cords of the blind to a defined wound up end position, the control circuitry may be arranged for controlling the electric motor, such that,
 the electric motor drives the cord winding/unwinding unit to wind up the one or more cords of the blind, and
 the electric motor stops the cord winding/unwinding unit winding up the one or more cords of the blind in case the control circuitry determines a defined reduction of the speed of rotation of the electric motor and/or
 the electric motor reaches an overvalue position, which is a defined distance, such as e.g. 15 cm, in the direction of winding up away from the defined wound up end position,
 and/or after a defined time period.

Moreover, the blind may be a tensioned blind and, for unwinding the one or more cords of the blind, the control circuitry may be arranged for controlling the electric motor, such that
 the electric motor drives the cord winding/unwinding unit to unwind the one or more cords of the blind, and
 the electric motor stops the cord winding/unwinding unit unwinding the one or more cords of the blind in case the control circuitry determines a defined reduction of the speed of rotation of the electric motor.

Furthermore, the blind may be a tensioned blind, and, for unwinding the one or more cords of the blind to a defined unwound end position, the control circuitry may be arranged for controlling the electric motor, such that,
 the electric motor drives the cord winding/unwinding unit to unwind the one or more cords of the blind, and
 the electric motor stops the cord winding/unwinding unit unwinding the one or more cords of the blind in case the control circuitry determines a defined reduction of the speed of rotation of the electric motor and/or
 the electric motor reaches an overvalue position, which is a defined distance, such as e.g. 10 cm, in the direction of unwinding away from the defined unwound end position.

In addition, in case the control circuitry determines the defined reduction of the speed of rotation of the electric motor before the electric motor reaches the defined unwound end position or the defined overvalue position, the control circuitry may be arranged for setting the position, at which the defined reduction of the speed of rotation of the electric motor is determined, as the defined unwound end position.

The above optional features may be arbitrarily combined according to the invention.

According to another aspect of the present invention a system is proposed, wherein the system comprises an electric drive unit for cords of blinds according to the present invention, and one or more cords of at least one blind, wherein the one or more cords of the at least one blind are connected to the cord winding/unwinding unit of the electric drive unit and the electric drive unit is arranged for winding/unwinding the one or more cords of the at least one blind.

According to a further aspect of the present invention a method for operating an electric drive unit for cords of blinds is proposed, wherein the electric drive unit comprises:
 a DC driven electric motor,
 a cord winding/unwinding unit driven by the electric motor, for winding/unwinding one or more cords of a blind, and
 a control circuitry being functionally connected to one or more rotation detection sensors, each rotation detection sensor being arranged for detecting increments of the rotation of the electric motor by cooperating with a rotating element driven by the electric motor, the rotating element having at least two discrete elements, the passage of which is detected as detection pulses by the one or more rotation detection sensor. According to the method the control circuitry controls the operation of the electric motor by controlling the DC supply of the electric motor, characterized in that the control circuitry controls the electric motor dependent on the time development of the detected passages.

Furthermore, according to the method, the control circuitry may determine the position of the electric motor corresponding to the position of the one or more cords of the blind by counting the number of detection pulses.

In addition, the control circuitry may be functionally connected to at least two rotation detection sensors, and according to the method the control circuitry may detect the direction of the rotation of the electric motor by evaluating the time development, such as e.g. the phase shift of the detection pulses of the two rotation detection sensors.

Moreover, according to the method, the control circuitry may stop the operation of the electric motor in case the time development of the detected passages indicates a defined reduction of the speed of rotation of the electric motor.

Furthermore, according to the method, the control circuitry may determine the speed of rotation of the electric motor by determining the number of detection pulses and/or the pulse width of at least one detection pulse during a time window of defined length, such as e.g. 50 ms.

In addition, according to the method, the control circuitry may determine an acceleration or deceleration of rotation of the electric motor by determining the number of detection pulses and/or the pulse width of at least one detection pulse during a first time window of defined length, such as e.g. 50 ms, and the number of detection pulses and/or the pulse width of at least one detection pulse during a second time window of the same length as the first time window, wherein a defined difference in the determination results indicates an acceleration or deceleration of rotation of the electric motor.

Moreover, according to the method, the control circuitry may determine an acceleration or deceleration of rotation of the electric motor by repeatedly determining the number of detection pulses and/or the pulse width of at least one detection pulse during time windows of defined length, such as e.g. 50 ms, with a defined time period, such as e.g. 200 ms, between one time window and a successive time window, wherein a defined difference between the determination result of the one time window and the determination result of the successive time window indicates an acceleration or deceleration of rotation of the electric motor.

Furthermore, according to the method, for winding the one or more cords of the blind up to a defined wound up end position, the control circuitry may control the electric motor, such that:
  the electric motor drives the cord winding/unwinding unit to wind up the one or more cords of the blind, and
  the electric motor stops the cord winding/unwinding unit winding up the one or more cords of the blind at the defined wound up end position and then drives the cord winding/unwinding unit to turn in the opposite direction in order to relax the one or more cords of the blind, or
  the electric motor stops the cord winding/unwinding unit winding up the one or more cords of the blind at a position, which is a defined number of detection pulses, such as e.g. 50 detection pulses, away from the defined wound up end position.

In addition, according to the method, for winding the one or more cords of the blind up to a defined wound up end position, the control circuitry may control the electric motor, such that the electric motor stops the cord winding/unwinding unit winding up the one or more cords of the blind in case the control circuitry determines a defined reduction of the speed of rotation of the electric motor Further, for winding the one or more cords of the blind up to a defined wound up end position, the control circuitry may control the electric motor, such that after a defined time period the electric motor stops the cord winding/unwinding unit winding up the one or more cords of the blind.

Moreover, according to the method, for winding or unwinding the one or more cords of the blind, the control circuitry may control the electric motor, such that
  the electric motor accelerates from a rest position to a first speed,
  the electric motor then drives the cord winding/unwinding unit at the first speed for a defined time period,
  the electric motor then accelerates to a second speed, and
  the electric motor then drives the cord winding/unwinding unit at the second speed until the control circuitry controls the electric motor to stop.

Furthermore, according to the method, for winding up the one or more cords of the blind, the control circuitry may control the electric motor, such that
  the electric motor drives the cord winding/unwinding unit to wind up the one or more cords of the blind, and
  the electric motor stops the cord winding/unwinding unit winding up the one or more cords of the blind in case the control circuitry determines a defined reduction of the speed of rotation of the electric motor and/or after a defined time period.

In addition, the blind may be a tensioned blind and, for winding up the one or more cords of the blind to a defined wound up end position, the control circuitry may control the electric motor, such that,
  the electric motor drives the cord winding/unwinding unit to wind up the one or more cords of the blind, and
  the electric motor stops the cord winding/unwinding unit winding up the one or more cords of the blind in case the control circuitry determines a defined reduction of the speed of rotation of the electric motor and/or the electric motor reaches an overvalue position, which is a defined distance, such as e.g. 15 cm, in the direction of winding up away from the defined wound up end position,
  and/or after a defined time period.

Moreover, the blind may be a tensioned blind and, for unwinding the one or more cords of the blind, the control circuitry may control the electric motor, such that
  the electric motor drives the cord winding/unwinding unit to unwind the one or more cords of the blind, and
  the electric motor stops the cord winding/unwinding unit unwinding the one or more cords of the blind in case the control circuitry determines a defined reduction of the speed of rotation of the electric motor.

Furthermore, the blind may be a tensioned blind, and, for unwinding the one or more cords of the blind to a defined unwound end position, the control circuitry may control the electric motor, such that,
  the electric motor drives the cord winding/unwinding unit to unwind the one or more cords of the blind, and
  the electric motor stops the cord winding/unwinding unit unwinding the one or more cords of the blind in case the control circuitry determines a defined reduction of the speed of rotation of the electric motor and/or the electric motor reaches an overvalue position, which is a defined distance, such as e.g. 10 cm, in the direction of unwinding away from the defined unwound end position.

In addition, according to the method, in case the control circuitry determines the defined reduction of the speed of rotation of the electric motor before the electric motor reaches the defined unwound end position or the defined overvalue position, the control circuitry may set the position, at which the defined reduction of the speed of rotation of the electric motor is determined, as the defined unwound end position.

The above optional features may be arbitrarily combined according to the invention.

BRIEF DESCRIPTION OF THE FIGURES

Further advantages, features and characteristics of the present invention will now be described by way of example, with reference to the accompanying drawings, in which:

FIG. 8 schematically shows an exemplary embodiment of a method performed by the control circuitry for determining the operation mode to operate in.

DETAILED DESCRIPTION OF THE FIGURES

Figure 1:
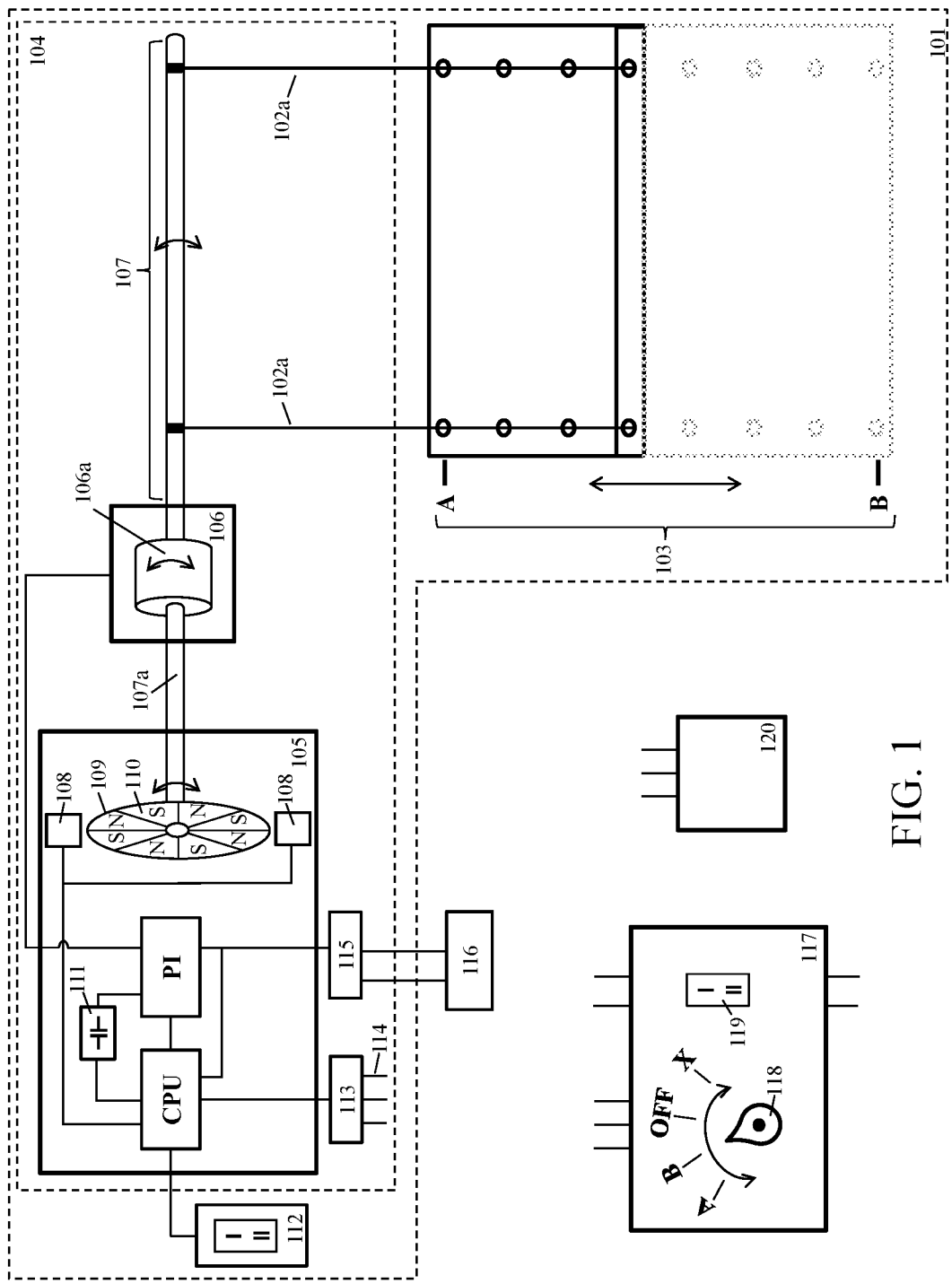
FIG. 1 schematically shows an exemplary embodiment of a system comprising an electric drive unit for cords of blinds according to the present invention.

FIG. 1 schematically shows a system 101 according to the present invention comprising an electric drive unit 104 for cords of blinds and a blind 103. The blind 103 is attached to the electric drive unit 104, in particular to the cord winding/unwinding unit 107 of the electric drive unit 104, by two cords 102a. However, according to the invention, the blind 103 may also be attached to the electric drive unit 104 by only one cord 102a or more than two cords 102a. The cords 102a correspond to lift cords and are wounded/unwounded in order to lift/lower the blind 103.

According to FIG. 1 the blind 103 is a free-hanging blind. However the blind 103 can also be a tensioned blind or a venetian blind. Any blind known to the skilled person, such as e.g. a roller blind, shutter, pleating etc., may be used according to the invention. In addition, according to the invention the electric drive unit 104 may open/close respectively lift/lower more than one blind, wherein the blinds are preferably of the same type.

Therefore, according to the invention, the system 101 comprises the electric drive unit 104 and one or more cords 102a of at least one blind 103. In the following, the present invention will be described with two cords 102a and one blind 103, wherein the cord winding/unwinding unit is arranged for winding/unwinding the two cords 102a of the blind 103.

Electric Drive Unit

The electric drive unit 104 comprises a control circuitry 105, an electric motor 106 and a cord winding/unwinding unit 107, wherein the control circuitry 105 controls the electric motor 106 to drive the cord winding/unwinding unit 107 for winding/unwinding the two cords 102a of the blind 103. In the following, winding/unwinding the cords 102a of the blind 103 corresponds to opening/closing respectively lifting/lowering the blind 103.

The control circuitry comprises a central processing unit (CPU) and a power interface (PI), wherein the CPU controls the PI to deliver a defined supply voltage, preferably a DC voltage, to the electric motor 106 for driving the cord winding/unwinding unit 107. The CPU may be a microcontroller, an ASIC or a hybrid thereof. According to the invention any CPU known to the skilled person may be used. The PI may be any voltage supply unit known by the skilled person that is able to be controlled for delivering a defined voltage to the electric motor 106.

The control circuitry 105, preferably the CPU, receives signals respectively operation signals from an operation unit 112 that may be used by an user for winding/unwinding the cords 102a of the blind 103 respectively for lifting/lowering the blind 103. The operation unit 112 is preferably a rocker switch. For example, in case the upper end (I) of the rocker switch 112 is pressed by a user, the control circuitry 105 controls the electric motor 106 to drive the cord winding/unwinding unit 107, such that the cord winding/unwinding unit 107 winds the cords 102a up, and, thus, the blind 103 is lifted. In case the lower end (II) of the rocker switch 112 is pressed by the user, the control circuitry 105 controls the electric motor 106 to drive the cord winding/unwinding unit 107 in the opposite direction, so that the cord winding/unwinding unit unwinds the cords 102a and, thus, the blind 103 is lowered. Of course the switch assignment can be the other way around and any operation unit 112 known to the skilled person for controlling the winding/unwinding of the cords 102a of the blind 103 may be used according to the invention.

The operation unit 112 may also comprise a function according to which the cords 102a of the blind 103 may be wounded from the current position to the wound up end position A or unwounded from the current position to the unwound end position B.

For example, when the upper end (I) of the operation unit 112 is pressed by a user for a defined time, the control circuitry 105 controls the electric motor 106 to drive the cord winding/unwinding unit 107, such that the cords 102a of the blind 103 are wounded up from the current position to the wound up end position A. That is the blind 103 is lifted from the current position to the wound up end position A, at which the blind 103 is opened or lifted up. Thus, in case the lower end (II) of the operation unit 112 is pressed by the user for a defined time, the control circuitry 105 controls the electric motor 106 to drive the cord winding/unwinding unit 107, such that the cords 102a of the blind 103 are unwounded from the current position to the unwound end position B.

That is the blind 103 is lowered from the current position to the unwound end position B, at which the blind 103 is closed or shut down.

In the following the wound up end position A corresponds to the upper end position, at which the cords 102a of the blind 103 are wound up, such that the blind 103 is opened or lifted up and the unwound end position B corresponds to the lower end position, at which the cords 102a of the blind 103 are unwound, such that the blind 103 is closed, shut down or lowered. Preferably, at the wound up end position A the cords 102a of the blind 103 are wound up, such that the blind 103 is completely opened or lifted up and at the unwound end position B the cords 102a of the blind 103 are unwound, such that the blind 103 is completely closed, shut down or lowered.

As shown in FIG. 1, the control circuitry 105 is functionally connected to a programming interface 113 and a voltage supply interface 115.

The programming interface 113 is arranged for being electrically and mechanically coupled to a programming tool, such as e.g. a programming box 117 or a programming key 120. Preferably, the programming interface comprises at least three pins or input pins 114 for receiving signals or programming signals from the programming tool for programming the control circuitry 105, preferably the CPU.

The voltage supply interface 115 is arranged for being electrically and mechanically coupled to a voltage source 116, preferably a DC voltage source supplying a DC-voltage of e.g. 24V. Preferably, the voltage supply interface 115 comprises at least two pins or input pins for taking up the voltage, preferably the DC-voltage, from the voltage source 116.

According to the invention, the electric drive unit 104 may also comprise only a voltage supply interface 115 without a separate programming interface 113. In such a case, the voltage supply interface 115 still receives the supply voltage, preferably DC-voltage, from the voltage source 116. Moreover, the voltage supply interface 115 may receive programming signals for programming the control circuitry 105, preferably the CPU, wherein the programming signals correspond to a defined modulation of the supply voltage. Thus, the voltage supply interface 115 corresponds in such a case to a programming interface receiving the supply voltage and programming signals as a modulation of the supply voltage. Therefore, according to the invention, the control circuitry 105 may receive via the programming interface programming signals and a supply voltage, wherein the programming signals correspond to a defined modulation of the supply voltage.

According to the invention, both the CPU and the power interface PI are supplied with voltage and, thus, with electric energy from the voltage supply interface 115, wherein the CPU controls the power interface PI for providing or supplying the voltage to the electric motor 106. That is, the CPU controls the amount of voltage supplied to the electric motor 106, the time, at which the voltage is supplied to the electric motor 106, and/or the time or time period, for which or during which the voltage is supplied to the electric motor 106.

As already mentioned, according to the invention, any means and method known to the skilled person for supplying a voltage respectively electric energy to an electric motor 106, wherein the supply is controlled by a control circuitry, preferably CPU, may be used.

Preferably, the control circuitry 105 comprises energy storage means 111, such as e.g. capacitors, for providing electric energy/power to the control circuitry 105, in particular the CPU and power interface PI, in case the voltage supply via the voltage supply interface 115 is interrupted. As a result thereof, parameters and settings, such as e.g. the wound up end position A, the unwound end position B, the current position of the cords 102a respectively the blind 103, the mode of operation etc., used by the control circuitry 105, preferably the CPU, for controlling the electric motor 106 and stored in a storage (not shown in FIG. 1) associated with the control circuitry 105, preferably the CPU, may be maintained, in case the voltage supply of the control circuitry 105 via the voltage supply interface 115 is interrupted or stopped. According to the invention, the energy storage means 11 do not need to be part of the control circuitry 105 as shown in FIG. 1 and, thus, may be provided differently in the electric drive unit 204.

The electric motor 106 is a DC driven electric motor, preferably an electric motor driven with a DC-voltage of 24V. The direction of rotation as well as the speed of rotation of the electric motor 106 is controlled by the control circuitry 105, preferably the CPU. According to the invention any DC driven electric motor known to the skilled person may be used.

The cord winding/unwinding unit 107 is driven by the electric motor 106. That is the direction of rotation of the electric motor 106 determines whether the cord winding/unwinding unit 107 winds or unwinds the cords 102a of the blind 103 and the speed of rotation of the electric determines at which speed the cord winding/unwinding unit winds or unwinds the cords 102a of the blind 103.

The electric drive unit 104 for cords of blinds, comprising the control circuitry 105, the electric motor 106 and the cord winding/unwinding unit 107, may be installed/arranged in the top panel or header panel of a blind system. Since there are certain industrial norms which e.g. define the arrangement of the cords 102a of the blind 103, the control circuitry 105 and the electric motor 106 are preferably provided at the side, in the sideward space towards a first cord 102a, of the header panel. This space at the side of the header panel has e.g. a length of about 135 mm.

Moreover, the circuit board of the control circuitry 105 has preferably a u-shaped form, wherein the means 111 for storing electrical energy, such as e.g. capacitors, are preferably arranged on the inner side of the u-shaped circuit board, facing to the inner side of the u-shape. Namely, such an arrangement is space-saving.

Position Detection

According to the present invention the control circuitry 105 may detect or determine the current position of the electric motor 106 and, thus, may detect or determine the current position of the cords 102a or the blind 103.

As shown in FIG. 1, a shaft 107a of the cord winding/unwinding unit 107 is extended from the rotor 106a of the electric motor 106, preferably in the direction of the control circuitry 105. The shaft 107a is connected to a rotating element 109, preferably a disk, comprising eight discrete elements 110, which are preferably magnetized sectors. According to the invention the rotating element 109 comprises at least two discrete elements 110, i.e. the rotating element 109 may comprise only two discrete elements 110 or more than two discrete elements 110. The rotating element 109 is arranged, such that two rotation detection sensors 108, preferably hall sensors, can detect the rotation of the eight discrete elements 110 of the rotating element 109, when the rotor 106a of the electric motor 106 and, thus, the extended shaft 107a rotates. According to the invention more than two rotation detection sensors 108 may also be provided.

The control circuitry 105, especially the CPU, is functionally connected to the two rotation detection sensors 108. According to FIG. 1 the two rotation detections sensors 108 are provided on the control circuitry 105. However, according to the invention, the two rotation detection sensors 108 may also not be part of the control circuitry 105.

When the electric motor 106 rotates, the rotating element 109 also rotates. Each time a discrete element 110 passes a rotation detection sensor 108, the corresponding rotation detection sensor 108 detects the passage of this discrete element as a pulse or detection pulse. That is the rotation detection sensor 108 generates and transmits a detection pulse to the control circuitry 105, preferably the CPU, each time a discrete element 110 of the rotating element 109 passes by.

Thus, the control circuitry 105, preferably the CPU, may determine the position of the electric motor 106 corresponding to the position of the cords 102a of the blind 103 by counting the number of detection pulses provided by the rotation detection sensors 108. That is the current position of the blind 103 being wounded or unwounded may be determined by the control circuitry 105 by counting the number of detection pulses.

This corresponds to a digital coding (rotational coding) of the position of the electric motor 106, as preferably the control circuitry 105 receives a detection peak respectively detection pulse each time a discrete element 110 passes a rotation detection sensor 108, i.e. each time a magnetized/magnetic sector 110 passes a hall sensor 108.

Preferably, the discrete elements 110 on the rotating element 109 are alternately magnetized, as shown in FIG. 1.

Thus, the position of the electric motor 106 respectively the position of the cords 102a and the blind 103 is coded by the count or number of detection pulses respectively peaks of the signals received from the rotation detection sensors 108. This corresponds to a rotation code.

The control circuitry 105 stores the count of detection pulses representing the current position of the electric motor 106 in the storage associated with the control circuitry 105, when the electric motor 106 stops rotating.

Therefore, the control circuitry 105 may control the electric motor 106 by counting the detection pulses received from the rotation detection sensors 108. That is the control circuitry 105 may control the electric motor 106 on the basis of the time development of the detected passages, as the passage of the discrete elements 110 at the rotation detection sensors 108 is detected by the rotation detection sensors 108 as detection pulses.

Detection of the Direction of Rotation

In order to detect or determine the direction of rotation of the electric motor and, thus, to determine, whether the cords 102a of the blind 103 are wound up or unwounded, the two rotation detection sensors 108, preferably hall sensors, have a different polarity and/or are arranged, such that the signals from the detection rotation sensors 108 are phase-shifted to each other. That is the signals, comprising a peak or detection pulse for each time a discrete element 109 passes by the corresponding detection rotation sensor 108, are phase-shifted to each other. Therefore, the control circuitry 105, preferably the CPU, may determine on the basis of the phase-shift between the two signals received from the two rotation detection sensors 108 the direction of rotation of the electric motor 106. Thus, the control circuitry 105 may know whether the cords 102a of the blind are wounded up or unwounded.

Programming Box

Figure 2:
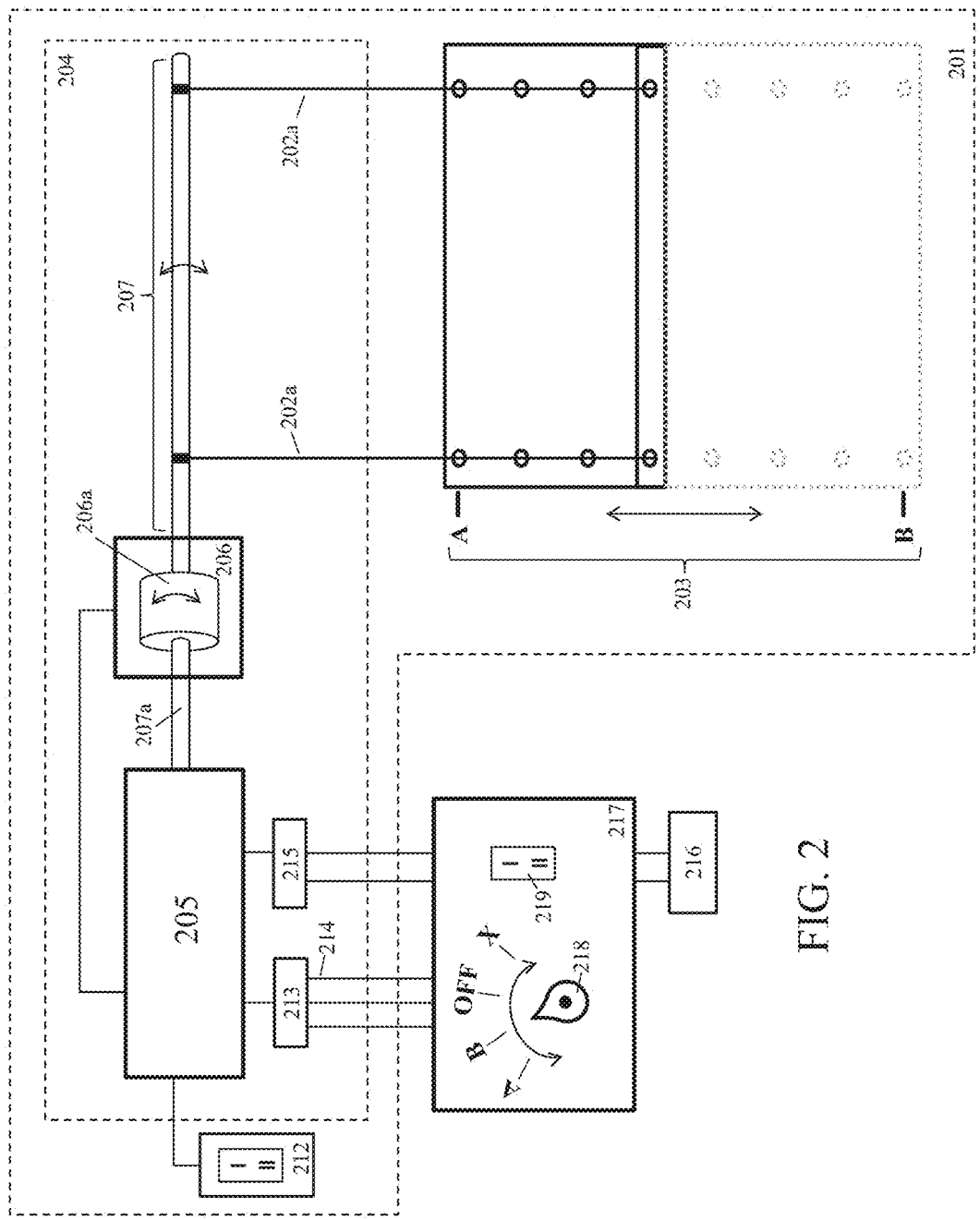
FIG. 2 schematically shows an exemplary embodiment of an electric drive unit for cords of blinds according to the present invention being connected to a programming box.

FIG. 2 schematically shows an exemplary embodiment of the electric drive unit 204 for cords of blinds according to the present invention being connected to a programming box. The system 201 and electric drive unit 204 correspond to the system 101 and electric drive unit 104 of FIG. 1, respectively and, thus, the above description is also valid for the exemplary embodiment according to FIG. 2. The last two numbers of the reference signs of the components of FIG. 2 correspond to the last two numbers of the reference signs of the components of FIG. 1. In the following, mainly new features or details with respect to the exemplary embodiment of FIG. 1 are described, in order to avoid unnecessary repetition.

As already mentioned the programming interface 213 of the electric drive unit 204 may be electrically and mechanically coupled to a programming tool. As shown in FIG. 2, for example a programming box 217 may be electrically and mechanically coupled or connected to the electric drive unit 204 as a programming tool. The programming box 217 is coupled to the electric drive unit 204 outside the normal operation state of the electric drive unit 204 for programming purposes. Namely, during the normal operation state, the electric drive unit 204, particularly the control circuitry 205, is controlled by the operation unit 212. For programming purposes, i.e. for programming the control circuitry 205, preferably the CPU, the programming box 217 is preferably connected between the electric drive unit 204, preferably the programming interface 113 and voltage supply interface 215, and the voltage source 216.

The programming box 217 comprises two switches 218 and 219. The switch 218 is preferably a turn-switch that can be switched or turned to select one out of the four programming states "A", "B", "OFF" and "X". According to the invention any means know to the skilled person for selecting one out of four programming states may be used for the switch 218. The switch 219 is preferably a rocker switch for controlling the electric motor 206 to drive the cord winding/unwinding unit 207 to wind/unwind the cords 202a of the blind 203, as described already above with respect to the operation unit 212. Of course any means known to the skilled person for controlling the winding/unwinding of the cords 202a of the blind 203 may be used for the switch 219.

The control circuitry 205 may be connected via the programming interface 213 to the programming box 217 in order to receive programming signals for programming, determining or setting parameters or settings of the control circuitry 205 for controlling the electric motor 206, such as e.g. the wound up end position A, the unwound end position B, an intermediate position of the cords 202a of the blind 203, an operation mode, a scheme for controlling the speed of rotation of the electric motor 206, a set value or set point for the speed of rotation etc. An intermediate position corresponds to a position between the wound up end position A and the unwound end position B, at which the blind is neither fully opened or lifted nor fully closed or lowered.

Preferably, the programming box does not comprise any actual electronic except of interface elements, such as switches or rocker switches. These interface elements may be used to selectively short-circuit the three pins or programming pins 214 of the programming interface 213. For example in case the switch 218 is set or turned to the position of the programming state "B" respectively position "B", as shown in FIG. 2, the corresponding pin or programming pin 214 of the programming interface 213 is short-circuited, so that the control circuitry 205 knows that the programming signals received via the programming interface 213 from the programming box 217 correspond to the programming state "B". This is the same for the programming states "A" and "X".

In the programming state "OFF", i.e. when the switch 218 is turned or set to the programming state "OFF", none of the pins 214 of the programming interface 213 are short circuited and the control circuitry 205, preferably, does not receive or see any programming signals.

In the programming state "A" the wound up end position A may be programmed or set and in the programming state "B" the unwound end position B and an intermediate position of the cords 202a or the blind 203 may be programmed or in case an intermediate position is already set, the intermediate position may be deleted. In the programming state "X" the connection between the programming box 217 and the electric drive unit 204 may be tested or checked, and the operation mode of the electric drive unit 304 may be programmed or set. Furthermore, in the programming state "X" the operation mode respectively the electric drive unit (204), preferably the control circuitry (205), may be reset to the delivery condition, wherein the end positions, i.e. the wound up end position A and the unwound end position B, as well as a possibly set intermediate position stored in the storage associated with the control circuitry 205 are preferably deleted.

An intermediate position of the cords 202a of the blind 203 corresponds to a position between the wound up end position A and the unwound end position B, at which the blind is neither fully opened or lifted nor fully closed or lowered.

The operation mode of the electric drive unit 304 corresponds to the type of blind that is opened/closed by the electric drive unit 204. Preferably, there are three defined operation modes according to which the electric drive unit 204 is able to operate. These three operation modes correspond preferably to operating a free hanging blind, a tensioned blind and a venetian blind, respectively. According to the invention, there may also be only two defined operation modes or more than three defined operation modes according to which the electric drive unit 204 is able to operate. The different operation modes may not only vary in the type of blind being operated, i.e. being opened/closed, by the electric drive unit 204. For example the operation modes may also vary in the control of the speed of rotation of the electric motor 206.

Preferably, the programming box 217 is used by the manufacturer to program or set parameters of the control circuitry 205 for controlling the electric motor 206, such as the wound up end position A and the unwound end position B.

Preferably, the operation unit 212 is not usable for winding/unwinding the cords 202a of the blind 203, when the programming box 217 is connected to the electric drive unit 204 for programming the control circuitry 205, preferably the CPU.

When connecting the programming box 217 to the electric drive unit 204, i.e. to the programming interface 213 and voltage supply interface 215, the voltage supply of the control circuitry 205 from the voltage source 216 is interrupted for a certain time. As mentioned already above, energy storage means 111, such as e.g. capacitors, provided in the electric drive unit 204 may preferably supply the control circuitry 205 with voltage respectively electric energy during this time, until the voltage is supplied again from the voltage source 216 via the programming box 217 and the voltage supply interface 215 to the control circuitry 205.

Programming Key

Figure 3:
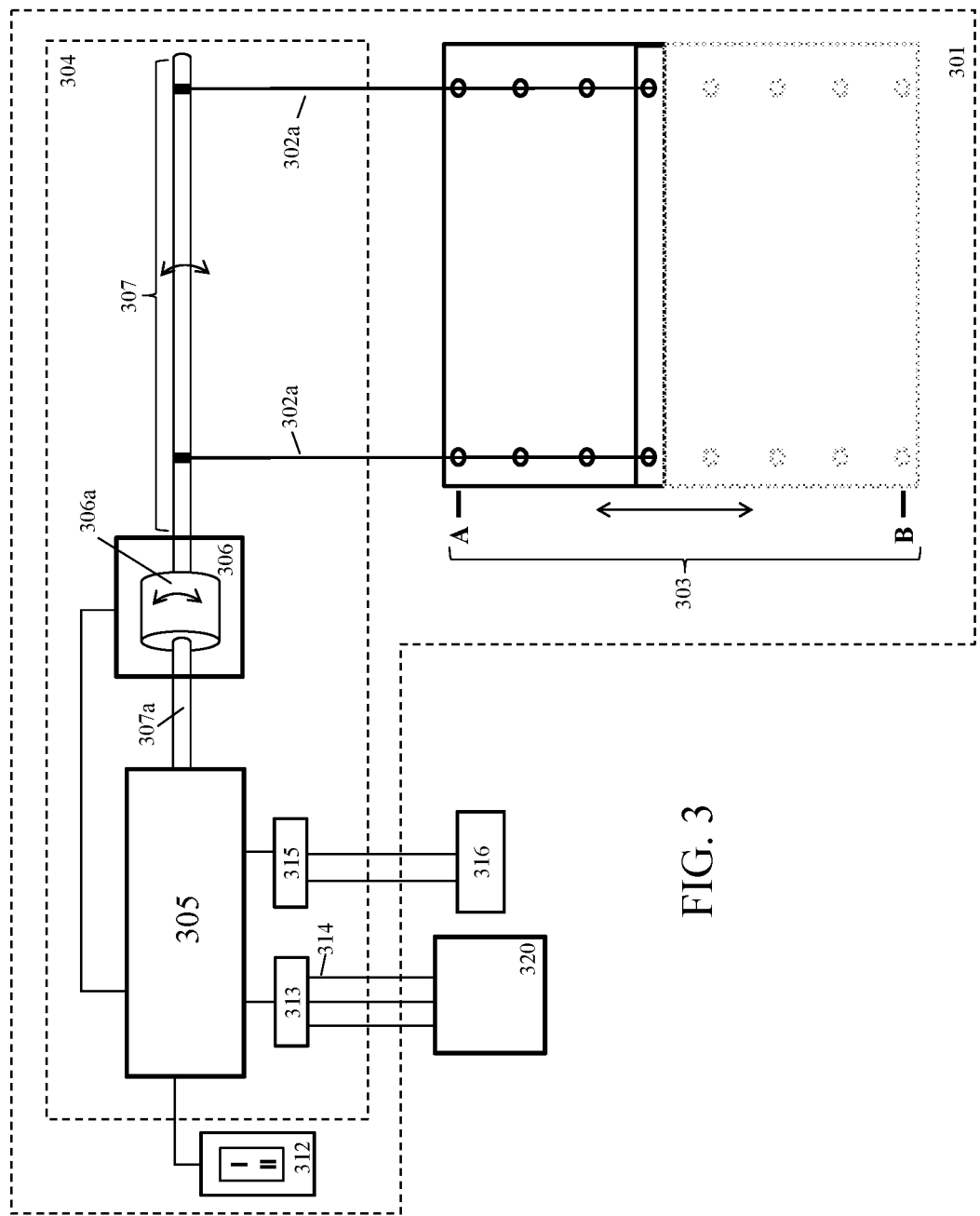
FIG. 3 schematically shows an exemplary embodiment of an electric drive unit for cords of blinds according to the present invention being connected to a programming key.

FIG. 3 schematically shows an exemplary embodiment of the electric drive unit 204 for cords of blinds according to the present invention being connected to a programming key. The system 301 and electric drive unit 304 correspond to the system 101 and electric drive unit 104 of FIG. 1 and the system 201 and electric drive unit 204 of FIG. 2, respectively. Thus, the above description is also valid for the exemplary embodiment according to FIG. 3. The last two numbers of the reference signs of the components of FIG. 3 correspond to the last two numbers of the reference signs of the components of FIGS. 1 and 2. In the following, mainly new features or details with respect to the exemplary embodiment of FIGS. 1 and 2 are described, in order to avoid unnecessary repetition.

As already mentioned, the programming interface 313 of the electric drive unit 304 may be electrically and mechanically coupled to a programming tool. As shown in FIG. 3, for example a programming key 320 may be electrically and mechanically coupled or connected to the electric drive unit 304 as a programming tool. The programming key 320 is, preferably, coupled to the electric drive unit 204 during the normal operation state of the electric drive unit 204 for programming purposes.

As already mentioned, the programming box 217 is preferably used by the manufacturer to program or set parameters of the control circuitry 205 for controlling the electric motor 206, such as the wound up end position A and the unwound end position B. The programming key is preferably used when installing or reinstalling the blind 303 and the electric drive unit 304 (the electric drive unit being installed in the header panel of the blind system 301) for programming a change of especially the unwound end position B. That is the programming key 320 may be used at the place of use of the electric drive unit 304, such as e.g. at home or office, by the customer in order to program or adapt the unwound end position B.

Therefore, when the programming key 320 is connected to the programming interface 313 (as shown in FIG. 3), the programming key 320 selectively short-circuits the input pin or programming pin 314 of the programming interface 313 that is provided for programming the unwound end position B. That is the programming key 320 short-circuits the programming pin 314 that is provided for receiving programming signals indicating the unwound end position B. For winding/respectively unwinding the cords 302a of the blind 303 when the programming key 320 is connected to the programming interface 313, the operation unit 312 may be used. In contrast to the programming with the programming box 217, as shown in FIG. 2, the control circuitry 305 is directly supplied with voltage via the voltage supply interface 315 from the voltage source 316, as it is the case during the normal operation state.

General Operation of the Electric Drive Unit During the Normal Operation State

Figure 4:
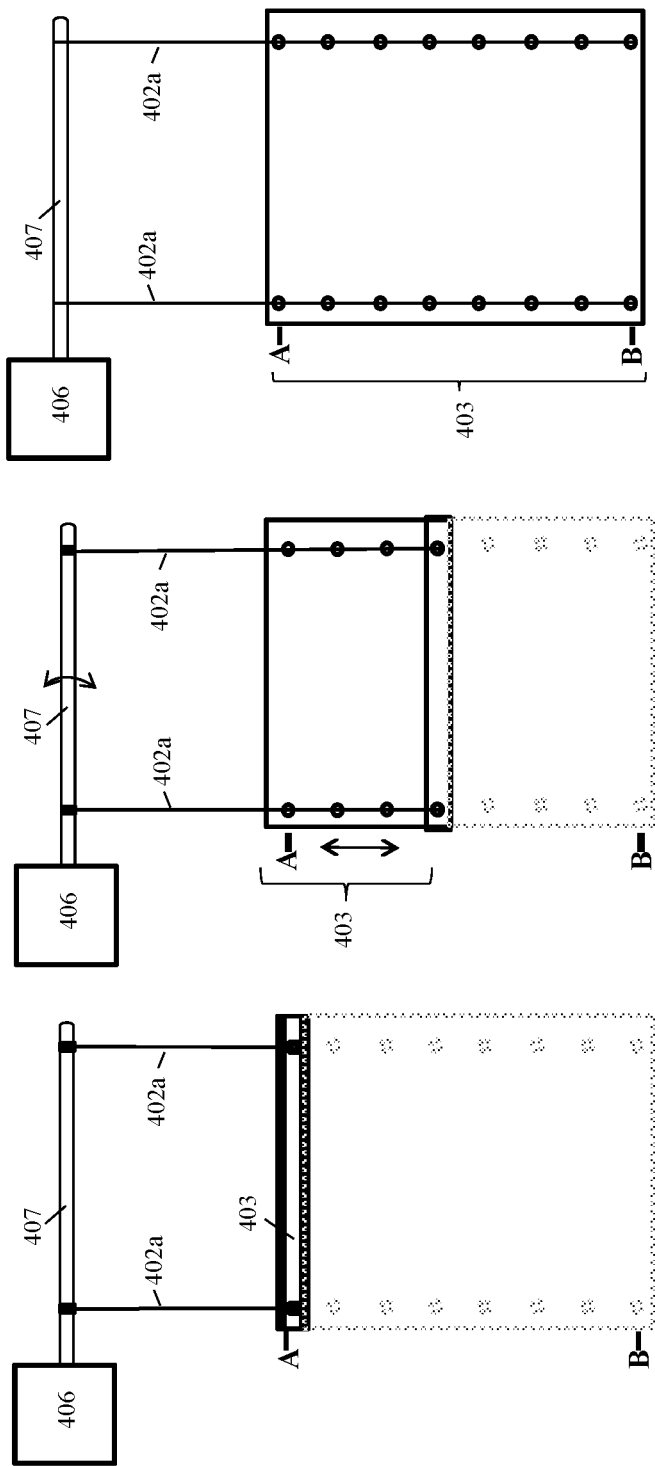
FIG. 4 schematically shows an exemplary embodiment of winding/unwinding cords of a blind respectively lifting/lowering a blind by the electric drive unit according to the present invention.

FIG. 4 schematically shows an exemplary embodiment of winding/unwinding cords of a blind respectively lifting/lowering a blind by the electric drive unit according to the present invention. The above description is also valid for the exemplary embodiment according to FIG. 4. The last two numbers of the reference signs of the components of FIG. 4 correspond to the last two numbers of the reference signs of the components of FIGS. 1 to 3. In the following, mainly new features or details with respect to the exemplary embodiment of FIGS. 1 to 3 are described, in order to avoid unnecessary repetition.

According to FIG. 4, depending on the direction of rotation of the electric motor 406 the cord winding/unwinding unit 407 is driven to wind/unwind the cords 402a of the blind 403. On the left side of FIG. 4, the cords 402a of the blind 403 are wound up to the wound up end position A and the blind 403 is fully opened or lifted up. However, according to the invention, the blind 403 does not have to be fully opened or lifted up, when the cords 402a of the blind 403 are wound up to the wound up end position A.

Preferably, the control circuitry 405 (not shown in FIG. 4) of the electric drive unit 404 (not fully shown in FIG. 4) sets the wound up end position A to the reference point with e.g. the value or count 0. Therefore, when the cords 402a being in the wound up end position A are unwounded, the control circuitry 405 counts the detection pulses, received from the rotation detection sensors 408 (not shown in FIG. 4) as a result of the rotation of the electric motor 406, starting from the value or count 0 until the electric motor 406 stops rotating. That is, the control circuitry 405 increments the value or count for each detection pulse received from a corresponding rotation detection sensor 408, when the cords 402a of the blind 403 are unwounded. The count is then stored by the control circuitry 405 in the storage associated with the control circuitry 405.

When the control circuitry 405 controls the electric motor 406 to rotate again, the stored count is read or loaded in order for the control circuitry 405 to know or determine the current position of the cords 402a of the blind 403 at the time of the electric motor 406 starting to rotate again.

In case the electric motor 406 rotates, such that the cord winding/unwinding unit 407 further unwinds the cords 402a, the control circuit further increments the count for each detection pulse received from a corresponding rotation detection sensor 408.

However, in case the electric motor 406 rotates in the opposite direction, i.e. the cord winding/unwinding unit 407 winds the cords 402a up, the control circuitry decrements the count for each detection pulse received from a corresponding rotation detection sensor 408.

The change in the direction of rotation of the electric motor 406, i.e. the change from unwinding to winding the cords 402a of the blind 403 or vice versa, may be determined by the control circuitry 405, as according to the invention the rotation of the electric motor 406 is detected by at least two rotation detection sensors 408, preferably hall sensors.

As already described above, the at least two rotation detection sensors 408 have a different polarity and/or are arranged, such that the signals, i.e. the detection pulses, received from these two rotation detection sensors 408 are phase-shifted to each other. Thus, the control circuitry 405 may know or determine a change in the direction of rotation of the electric motor 406 on the basis of this phase-shift.

In the middle of the FIG. 4 the cords 402a of the blind 403 are at an intermediate position between the wound up end position A and the unwound end position B. Preferably, the count corresponding to such an intermediate position is greater than the count corresponding to the wound up end position A, which is preferably 0, but is smaller than the count corresponding to the unwound end position B. When the cords 402a are unwounded starting from the intermediate position the count is incremented by the control circuitry 405 for each detection pulse received from a corresponding rotation detection sensor 408. When the cords 402 are wounded up starting from the intermediate position the count is decremented by the control circuitry 405 for each detection pulse received from a corresponding rotation detection sensor 408.

On the right side of FIG. 4, the cords 402a of the blind 403 are unwounded to the unwound end position B and the blind 403 is fully closed or lowered. However, according to the invention, the blind 403 does not have to be fully closed or lowered, when the cords 402a of the blind 403 are unwounded to the unwound end position B.

According to the invention the control circuitry 405 of the electric drive unit may also set the wound up end position B or any other intermediate position to the reference point with e.g. the value or count 0.

Detection of the Speed of Rotation of the Electric Motor

For the following description, references are made again to FIG. 1, i.e. the reference signs of FIG. 1 are used again.

According to the invention the control circuitry 105, preferably the CPU, may detect or determine the speed of rotation of the electric motor 106 and, thus, may determine the speed at which the cord winding/unwinding unit 107 winds/unwinds the cords 102a of the blind 103.

For determining the speed of rotation of the electric motor 106, the control circuitry 105 counts or determines the number of detection pulses received during a time window of defined length. The time window has a defined length or duration of preferably 50 ms. Therefore, the control circuitry 105 determines on the basis of the frequency of the signals, i.e. the detection pulses, received from the rotation detection sensors 108, the speed of rotation of the electric motor 106. Moreover, the control circuitry 105 may determine the pulse width of at least one detection pulse during the time window of defined length in order to determine the speed of rotation of the electric motor 106.

Detection of a Change in the Speed of Rotation of the Electric Motor

Furthermore, the control circuitry 105, preferably the CPU, may detect or determine a change in the speed of rotation of the electric motor 106, i.e. an increase or reduction of the speed of rotation of the electric motor 106 corresponding to an acceleration or deceleration of rotation of the electric motor 106. Therefore, the control circuitry 105 may determine an acceleration or deceleration of the winding/unwinding of the cords 102a of the blind 103 by the cord winding/unwinding unit 107.

For determining the acceleration or deceleration of rotation of the electric motor 106, the control circuitry 105 determines or counts the number of detection pulses received during two time windows of the same defined length or duration, which is preferably 50 ms. A defined difference in the two determination results indicates an acceleration or deceleration of rotation of the electric motor. For example, in case the number of detection pulses determined or counted by the control circuitry 105 during a first time window of a defined length is greater by a defined value, such as e.g. 10 detection pulses, than the number of detection pulses determined or counted by the control circuitry 105 during a successive second time window of the same defined length, the control circuitry 105 determines that the speed of rotation of the electric motor 106 has been reduced. The difference between the determination result of the first time window and the determination result of the second time window is a measure for the increase or reduction of the speed of rotation of the electric motor 106. That is, if the difference between the two determination results is great, then the change in the speed of rotation of the electric motor 106 is also great.

The control circuitry 105 may also determine the acceleration or deceleration of rotation of the electric motor 106 by determining the pulse width of at least one detection pulse during two time windows of the same defined length or duration, which is preferably 50 ms. A defined difference in the two determination results indicates an acceleration or deceleration of rotation of the electric motor 106.

According to the invention, the control circuitry 105 determines that the speed of rotation of the electric motor 106 has changed, i.e. increased or decreased, in case there is a significant difference between the number of detection pulses counted by the control circuitry 105 during a first time window of defined length and the number of detection pulses counted by the control circuitry 105 during a second successive time window of the same length. That is, the control circuitry 105 determines that the speed of rotation of the electric motor 106 has changed, in case the frequency of the detection pulses during the first time window significantly differs from the frequency of the detection pulses during the second time window. Between the first and second time window, there is preferably a defined time period, of e.g. 200 ms, during which no determination or detection of the speed of rotation of the electric motor 106 is carried out by the control circuitry 105.

Preferably, the control circuitry 105 repeatedly determines the number of detection pulses and/or the pulse width of at least one detection pulse during time windows of defined length, such as e.g. 50 ms, with a defined time period, such as e.g. 200 ms, between one time window and a successive time window, wherein a defined difference or significant difference between the determination result of the one time window and the determination result of the successive time window indicates an acceleration or deceleration of rotation of the electric motor 106. A significant difference corresponds e.g. to a value of 10 detection pulses respectively a predefined difference in the pulse width.

Thus, the control circuitry 105 determines whether the number of detection pulses received from the rotation detection sensors 108 and/or the pulse width has changed in two successive time windows of defined length in order to determine whether the speed of rotation of the electric motor 106 has changed.

This is a very fast and sensitive detection of the speed of rotation of the electric motor 106 and a change of the speed of rotation of the electric motor 106. A detection of the speed of rotation of the electric motor with the same accuracy and temporal resolution using a detection of the current being consumed (taken up) by the electric motor 106 would be more expensive and space consuming. Namely, expensive and space consuming electronics is required for such a detection of the current.

Moreover, the rotating element 109 having preferably eight discrete magnetic elements of alternating polarity allows the control circuitry 105 to detect or determine the speed of rotation and a change of the speed of rotation of the electric motor 106 at such a high frequency, as described above.

Control of the Speed of Rotation

Preferably, the control circuitry 105, in particular the CPU, controls the speed of rotation of the electric motor 106 in a feed forward control, wherein the speed of rotation profile of the electric motor 106 is set or determined by a current profile. That is, the control circuitry 105 controls the voltage supplied to the electric motor 106 in order to control the speed of rotation of the electric motor 106.

For example, the CPU of the control circuitry 105 may deliver a PWM (pulse width modulated) signal to the power interface PI for determining or setting the voltage to be supplied to the electric motor 106. Preferably, by increasing the PWM signal, i.e. increasing the on-time ($t_{ON}$) or duty cycle ($t_{ON}/T$, wherein T is the period of the PWM signal) of the PWM signal, the voltage supplied from the control circuitry 105, preferably the power interface PI, to the electric motor 106 is increased. Therefore, when the CPU increases the on-time ($t_{ON}$) respectively the duty cycle ($t_{ON}/T$) of the PWM signal delivered to the power interface PI, the voltage supplied to the electric motor 106 is increased and, thus, the speed of rotation of the electric motor 106 increases.

However, according to the invention the control circuitry, preferably the CPU, may also control the speed of rotation of the electric motor 106 in a feed back control. Namely, as described already above, the speed of rotation of the electric motor 106 is repeatedly determined by the control circuitry in successive time windows of define length, with a defined time period of no detection between the time windows. Thus the control circuitry, preferably the CPU, may control the actual value of the speed of rotation to a set value respectively target value of speed of rotation. The control circuitry may preferably perform a control algorithms in order to set the actual value of the speed of rotation to a set value.

Speed of Rotation when Starting the Electric Motor from Rest

Generally, according to the invention, the control circuitry 105 controls the electric motor 105 to start rotating at a low speed of rotation. That is in case the electric motor is at rest, i.e. does not rotate, the control circuitry 105 controls the electric motor 106, such that the electric motor starts to rotate at a lower speed of rotation compared to the speed of rotation normally used for driving the cord winding/unwinding unit to wind/unwind the cords 102a of the blind 103.

Figure 5:
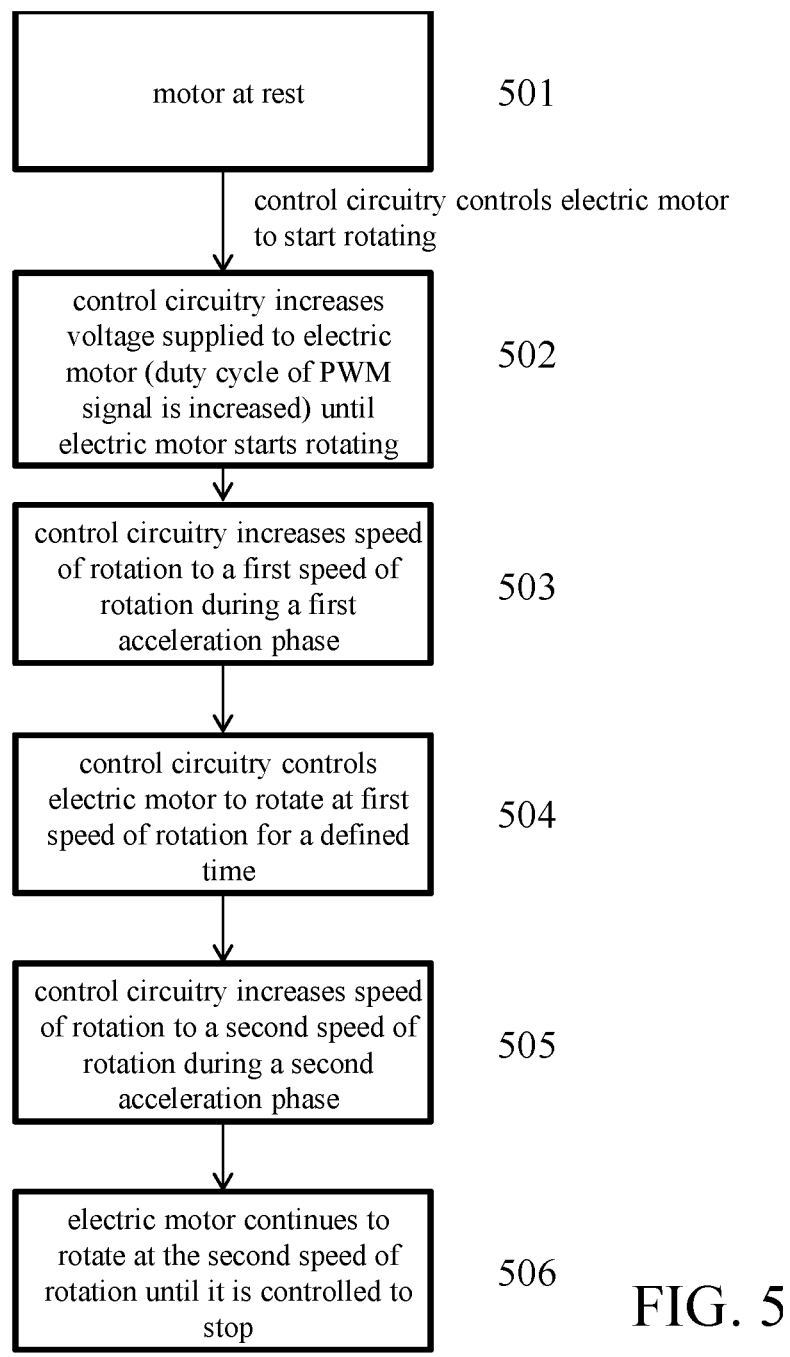
FIG. 5 schematically shows an exemplary embodiment of a control method for controlling the electric motor of the electric drive unit to start rotating according to the present invention FIGS. 6a and 6b schematically shows two exemplary embodiments of a control method for controlling the electric motor of the electric drive unit to wind the cords of the blind up to the wound up end position A according to the present invention.

In the following, the control of the speed of rotation of the electric motor 106 when starting the electric motor 106 from rest is described with respect to FIG. 5: At the beginning the electric motor 106 is at rest, i.e. the electric motor is not rotating and thus the cords 102a of the blind 103 are neither wounded up nor unwounded (step 501). For starting the electric motor 106 from rest the control circuitry 105, preferably the CPU, increases the voltage supplied to the electric motor 106 until the electric motor 106 starts rotating (step 502). Preferably, the voltage supplied to the electric motor 106 is increased by increasing the duty cycle ($t_{ON}/T$) or on-time ($t_{ON}$) of the PWM signal delivered from the CPU to the power interface PI. That is, the control circuitry 105 increases the duty cycle ($t_{ON}/T$) or on-time ($t_{ON}$) of the PWM signal in order to increase the voltage supplied to the electric motor 106 and, thus, the speed of rotation of the electric motor 106.

Next the control circuitry 105 controls the electric motor 106 to increase the speed of rotation during a first acceleration phase until a first speed of rotation is reached (step 503) and then controls the electric motor 106 to keep rotating at this first speed of rotation for a defined time (step 504). After this defined time, the control circuitry 105 controls the electric motor 106 to further increase the speed of rotation during a second acceleration phase until a second speed of rotation is reached (step 505). This second speed of rotation is higher than the first speed of rotation and corresponds to the normal speed of rotation of the electric motor 106 for driving the cord winding/unwinding unit 107 to wind/unwind the cords 102a of the blind 103. The electric motor 106 continues to rotate at the second speed of rotation until the control circuitry controls the electric motor 106 to stop rotating (step 506).

The increase of the speed of rotation is achieved by the control circuitry 105 by increasing the voltage supplied to the electric motor 106. Preferably, the increase of the voltage supplied to the electric motor 106 is achieved by increasing the duty cycle or on-time of the PWM signal delivered to the power interface PI of the control circuitry 105. Generally, when the control circuitry 105 controls the electric motor 106 to start rotating and, thus, to start driving the cord winding/unwinding unit to wind/unwind the cords 102a of the blind 103, the control circuitry 105 controls the electric motor 106 to first rotate at a lower speed of rotation for a defined time before rotating at the normal speed of rotation used for winding/unwinding the cords 102a.

Control Methods for Winding the Cords of the Blind Up to the Wound Up End Position A According to the invention the wound up end position A is defined by the manufacturer and/or may be programmed using a programming tool at a later stage, such as e.g. when installing the electric drive unit 104 and/or the blind 103. The wound up end position A is one of the parameters stored in a storage associated with the control circuitry 105 and used by the control circuitry 105 for controlling the electric motor 106.

Figure 6A:
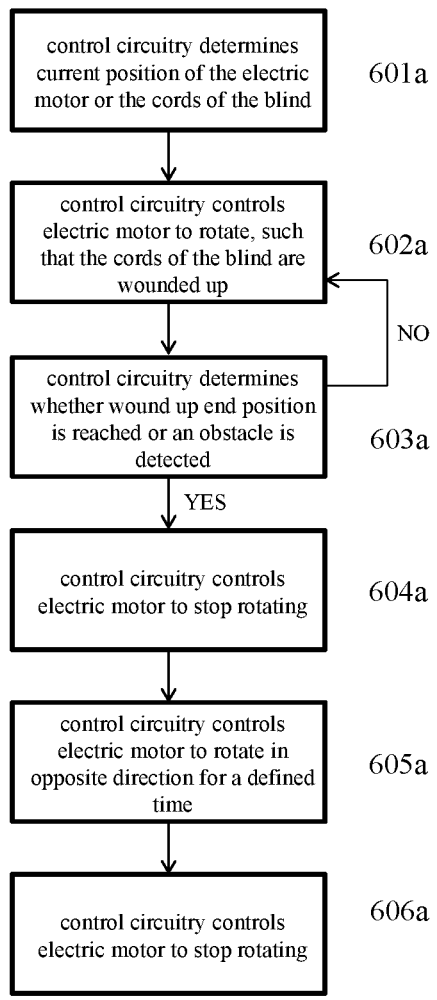

When a user operates or instructs the control circuitry 105 via the operation unit 112 or the switch 119 of the programming box 117 to wind up the cords 102a, the control circuitry 106 performs the control method shown in FIG. 6a.

At first the control circuitry determines the current position of the cords 102a (step 601a) by reading or loading the count of detection pulses, stored in the storage (associated with the control circuitry) the last time the electric motor stopped rotating. Namely, as described already above, the wound up end position may be set as the reference point with a count of 0 and when winding/unwinding the cords 102a the count of detection pulses is decremented/incremented each time detection pulses are received from the rotation detection sensors 108.

Next the control circuitry 105 controls the electric motor 106 to start rotating, such that the cord winding/unwinding unit 107 is driven to wind the cords 102a of the blind 103 up (step 602a). During the winding of the cords 102a the control circuitry 105 determines or checks repeatedly whether the current position of the cords 102a corresponds to the defined wound up end position A (step 603a).

In case the current position of the cords 102a does not correspond to the wound up end position A (NO at step 603a), the control circuitry 106 controls the electric motor 106 to keep rotating (step 602a) and, thus, winding the cords 102a up. Furthermore, the control circuitry keeps checking whether the current position of the cords 102a corresponds to the wound up end position A (step 603a).

In case the current position of the cords 102a corresponds to the wound up end position A or in case the control circuitry 105 detects an obstacle or blockade by e.g. detecting a defined reduction of speed of rotation of the electric motor 106 (YES at step 603a), the control circuitry 105 controls the electric motor 106 to stop rotating and stores the count in the storage (step 604a). In the first case, the count corresponds to 0, since the cords 102a have reached the wound up end position A, which is preferably the reference point with a value or count of 0.

Next, the control circuitry 105 controls the electric motor 106 to shortly rotate or turn in the opposite direction compared with the direction of rotation for winding the cords 102a up, in order to relax the cords 102a and the blind 103 (step 605a). That is, the control circuitry 105 controls the electric motor 106 to rotate in the direction for unwinding the cords 102a of the blind 103 for a defined number or count of detection pulses. Thus, the relaxing of the cords 102a may be programmed by the manufacturer by setting the number or count of detection pulses of the rotation code for which the electric motor 106 has to rotate in the direction of unwinding the cords 102a.

After the relaxation step 605a, the control circuitry 105 controls the electric motor to stop rotating and saves the count of detection pulses indicating the current position of the cords 102a (step 606a).

Figure 6B:
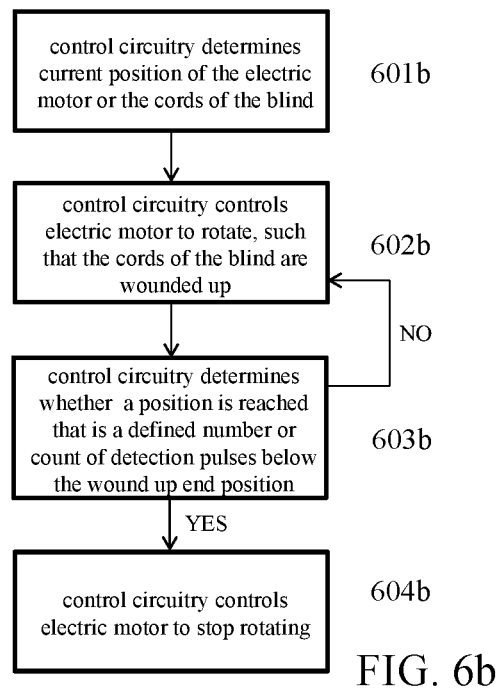

For winding the cords 102a up to the wound up end position A, the control circuitry 105 may also control the electric motor 106 according to the control method of FIG. 6b. According thereto, the cords 102a are wound up to a position, which is a defined number or count of detection pulses, such as e.g. 50 detection pulses, below the wound up end position A.

At first the control circuitry determines the current position of the cords 102a (step 601b) by reading or loading the count of detection pulses, stored in the storage (associated with the control circuitry) the last time the electric motor stopped rotating. This corresponds to the step 601a of FIG. 6a.

Next the control circuitry 105 controls the electric motor 106 to start rotating, such that the cord winding/unwinding unit 107 is driven to wind the cords 102a of the blind 103 up (step 602b). This corresponds to the step 602a of FIG. 6a.

During the winding of the cords 102a the control circuitry determines or checks repeatedly whether the current position of the cords 102a corresponds to the position, which is a defined number or count of detection pulses below the wound up end position A (step 603b).

In case the current position of the cords 102a does not correspond to this position below the wound up end position A (NO at step 603b), the control circuitry 106 controls the electric motor 106 to keep rotating (step 602b) and, thus, winding the cords 102a up. Furthermore, the control circuitry keeps checking whether the current position of the cords 102a corresponds to the defined position below the wound up end position A (step 603b).

In case the current position of the cords 102a corresponds to the wound up end position A (YES at step 603b), the control circuitry 105 controls the electric motor 106 to stop rotating and stores the count in the storage (step 604).

The above described control methods according to FIGS. 6a and 6b for winding the cords 102a up to the wound up end position A prevent the cords 102a as well as the blind 103 to be mechanically stressed, as a result of being wounded up or kept in place at the wound up end position A under a high tension.

In addition, for winding the cords 102a up to the wound up end position A, the control circuitry may also control the electric motor 106, such that the electric motor 106 stops the cord winding/unwinding unit 107 after a defined time or time period, such as e.g. 3 minutes. That is, in case the cords 102a do not have reached the wound up end position A respectively a defined position below the wound up end position A after a defined time of e.g. 3 minutes, the control circuitry 105 controls the electric motor 106 to stop rotating. This allows to stop the electric motor 106 rotating after a defined time, in case e.g. the cords 102a are teared or have been ripped, i.e. the wound up end position A respectively the defined position below the wound up end position A is never reached.

Different Types of Blinds

As mentioned already above, the electric drive unit 104 according to the present invention may operate in different defined operation modes. Preferably, this means that the electric drive unit 104 is able to operate at least three different types of blinds.

Figure 7:
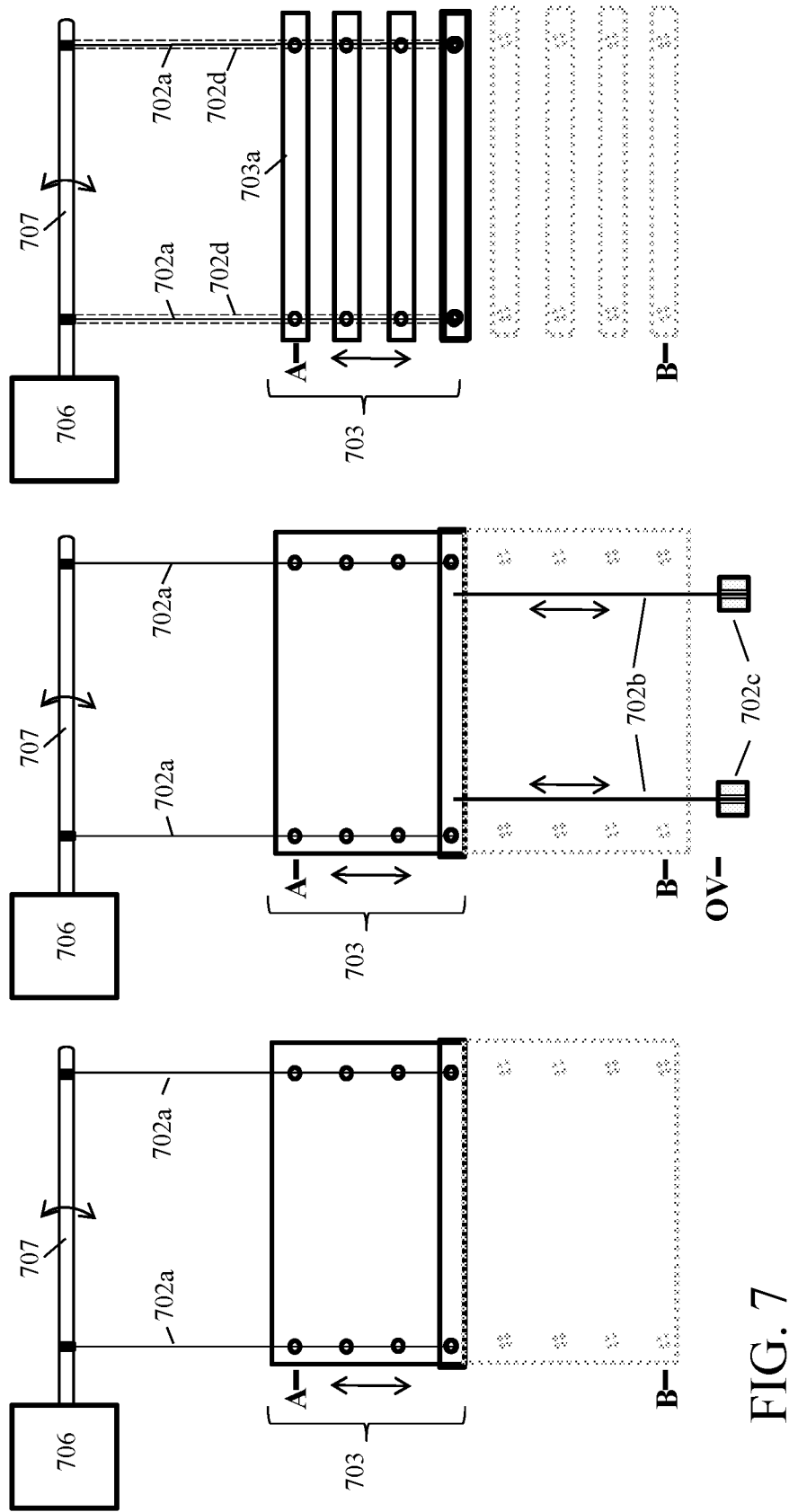
FIG. 7 schematically shows an exemplary embodiment of three different types of blinds being operable by the electric drive unit for cords of blinds according to the present invention.

In this regard, FIG. 7 schematically shows an exemplary embodiment of three different types of blinds being operable by the electric drive unit 104 according to the present invention. The last two numbers of the reference signs of the components of FIG. 7 correspond to the last two numbers of the reference signs of the components of FIGS. 1 to 4.

Free-Hanging Blind

On the left side of FIG. 7 the blind 703 is a free-hanging blind, wherein the blind 703 is lifted/lowered by winding/unwinding the cords or lift cords 702a of the blind 703. The blind is lifted due to the torque produced when the electric motor 706 drives the cord winding/unwinding unit to wind the cords 702a of the blind 703 up. The blind 703 is passively lowered. Namely, when the electric motor 706 drives the cord winding/unwinding unit to unwind the cords 702a of the blind 703, the blind 703 being a free-hanging blind is lowered due to the own weight being pulled down by gravity.

Tensioned Blind

In the middle of FIG. 7 the blind 703 is a tensioned blind. Such a blind is characterized in that the lowering or closing of the blind 703 is not carried out passively by gravity as described above with regard to the free-hanging blind, but the lowering or closing of the blind 703 is carried out actively by second cords 702b. According to the invention at least one second cord 702b must be provided. For the following description, it will be assumed that two second cords 702b are provided, as shown in the middle of FIG. 7.

The second cords 702b are attached at the lower end part of the blind 703 and are also wounded/unwounded by the cord winding/unwinding unit 707. Preferably, the second cords 702b are deflected by deflection sheaves or pulleys 702c at the bottom panel and directed to the cord winding/unwinding unit 707. According to the invention any means known to the skilled person that wind/unwind the second cords 702b in response to the electric motor 706 rotating to unwind/wind the cords 702a may be used. That is, when the cords or lift cords 702a are wounded/unwounded the second cords 702b are unwounded/wounded, respectively. The lower end part of the blind 703 corresponds to the end part of the blind 703 facing the unwound end position B. The bottom panel is the panel of the blind system that is arranged at the side of the unwound end position B.

Preferably, the tensioned blind 703 is installed in a frame, wherein the header panel or top panel comprising the electric drive unit 704 (not fully shown in FIG. 7) is provided at the top side of the frame, i.e. at the side of the frame that is above the wound up end position A. The bottom panel, preferably comprising the deflection sheaves respectively pulleys 702c or other means for winding/unwinding the second cords 702b, is provided at the bottom side of the frame, i.e. at the side of the frame that is below the unwound end position B.

When the electric motor 706 rotates in order to lower the tensioned blind 703, the blind 703 is released under a certain tension as a result of unwinding the cords 702a and at the same time the blind 703 is pulled down in the direction of the unwound end position B by the second cords 702b, which are wounded up by the electric motor 706, in particular the cord winding/unwinding unit 707.

The cords 702a and the second cords 702b are not fixed or bound to the cord winding/unwinding unit 707, preferably the winding shaft of the cord winding/unwinding unit 707, but they are attached to the cord winding/unwinding unit 707 due to friction. Namely, the cords 702a and second cords 702b are wounded, enlaced or wrapped around the winding shaft of the cord winding/unwinding unit 707 for several enlacements, such as e.g. 11 enlacements. As a result the cords 702a and second cords 702b are attached to the cord winding/unwinding unit 707 due to the friction caused by the enlacements.

Venetian Blind

On the right side of FIG. 7 the blind 703 is a venetian blind. Such a blind is characterized by horizontal lamellas 703a, which are equally spaced from each other and can be rotated or turned in order to change the opening angle. The lamellas 703a are preferably made of aluminum, but any other material, such as plastic, wood etc., may also be used. The alignment or orientation respectively the position of the lamellas 703a may be changed by ladder cords 702d, which are provided in addition to the cords or lift cords 702a being wounded/unwounded to lift/lower the blind 703. That is the ladder cords 702d are provided for changing the opening angle of the horizontal lamellas 703a of the blind 703. According to the invention at least one ladder cord 702d must be provided for the venetian blind. For the following description, it will be assumed that two ladder cords 702d are provided, as shown on the right of FIG. 7.

Programming of the Electric Drive Unit

As mentioned already above, the electric drive unit 104 is arranged for being electrically and mechanically coupled to a programming tool, such as e.g. the programming box 117 and the programming key 120, in order for being programmed. In detail, the programming interface 113 may be connected to a programming tool, in order to program parameters or settings of the control circuitry 105, which are used by the control circuitry 105, preferably the CPU, for controlling the electric motor 106.

These parameters or settings are e.g. the wound up end position A, the unwound end position B, an intermediate position, a set speed of rotation, a control scheme for controlling the speed of rotation of the electric motor 106, an operation mode indicating e.g. what type of blind is being opened/closed etc.

In the following a programming of the control circuitry 105, preferably the CPU, is exemplarily described by using the programming box 117 and the programming key 120. However, any other programming tool may be used to perform the programming of the control circuitry according to the present invention.

Initialization of the Programming Mode

After having connected the programming box 117 to the electric drive unit as described above with regard to FIG. 2, the user may check whether the programming box 117 is properly connected to the programming interface 113 of the electric drive unit 104. For this, the user turns the switch 118 in the position "X" and presses the switch 119 for a defined time, preferably for several seconds. In case the programming box 117 is properly connected to the programming interface 113, the control circuitry 105 controls the electric motor 106 according to a defined or preprogrammed short control scheme, in order to indicate the proper connection to the user.

Preferably, the control circuitry 105 also deletes any preprogrammed positions, such as e.g. the wound up end position A and the unwound end position B, in the storage associated with the control circuitry 105, in case of a proper connection between the programming box 117 and the programming interface 113. Namely, when programming the control circuitry 105, preferably, the user programs both the wound up end position A and the unwound end position B.

Determination of the Polarity of the Electric Motor for Reaching the End Positions As a result of programming or setting the wound up end position A and the unwound end position B using the programming tool, the control circuitry 105, preferably the CPU, learns the respective polarity of the supply voltage respectively the direction of rotation of the electric motor 106 for reaching these two end position. That is the control circuitry 105 learns or gets to know the direction of rotation of the electric motor 106 respectively the polarity of the supply voltage for winding the cords 102a of the blind 103 up to the wound up end position A and the direction of rotation of the electric motor 106 respectively the polarity of the supply voltage for unwinding the cords 102a of the blind 103 to the unwound end position B.

Therefore, in case the electric motor 106 is not installed in the header panel at the predefined position, such as e.g. the electric motor is installed on the right side instead of the left side of the header panel, or the polarity of the wiring is interchanged, the control circuitry 105 may internally adapt the assignment of the polarity of the supply voltage respectively the direction of rotation of the electric motor 106 with respect to winding/unwinding the cords 102a of the blind 103.

As a result, the electric drive unit 104, especially the electric motor 106, may be installed in the header panel any way around, as the control circuitry 105 learns during the programming of the two end positions A and B the necessary polarity of the supply voltage respectively direction of rotation of the electric motor 106 for reaching these end positions.

Programming the Operation Mode

As already mentioned above, the electric drive unit 104, preferably the control circuitry 105, is arranged for operating according to at least two, preferably three, defined operation modes. For the following description, it will be assumed that the electric drive unit 104 is arranged for operating in three defined operation modes, wherein the three defined operation modes correspond to "operating a free-hanging blind", "operating a tensioned blind" and "operating a venetian blind", respectively.

Preferably, the operation mode set by the manufacturer corresponds to "operating a free-hanging blind". The user may however change the operation mode using the programming box 117.

For setting the operation mode of the control circuitry 105 from "operating a free-hanging blind" to "operating a tensioned blind" the user operates the switch 119 (while the switch 118 is in the "OFF" position), such that the cords 102a of the blind 103 are unwounded to the (currently set) unwound end position B. That is the electric motor 106 respectively the cords 102a are driven to the unwound end position B. When the electric motor 106 respectively the cords 102a are at the unwound end position B, the user switches the switch 118 from the "OFF" position to the "X" position and then presses the switch 119 for a defined time, preferably one second, while the switch 118 is in the "X" position. This indicates to the control circuitry 105 that the operation mode is changed from "operating a free-hanging blind" to "operating a tensioned blind". After this the user turns the switch 118 again to the "OFF" position.

For setting the operation mode of the control circuitry 105 from "operating a free-hanging blind" to "operating a venetian blind" the user operates the switch 119 (while the switch 118 is in the "OFF" position"), such that the cords 102a of the blind 103 are wounded up to the (currently set) wound up end position A. That is the electric motor 106 respectively the cords 102a are driven to the wound up end position A. When the electric motor 106 respectively the cords 102a are at the wound up end position A, the user switches the switch 118 from the "OFF" position to the "X" position and then presses the switch 119 for a defined time, preferably one second, while the switch 118 is in the "X" position. This indicates to the control circuitry 105 that the operation mode is changed from "operating a free-hanging blind" to "operating a venetian blind". After this the user turns the switch 118 again to the "OFF" position.

Figure 8:
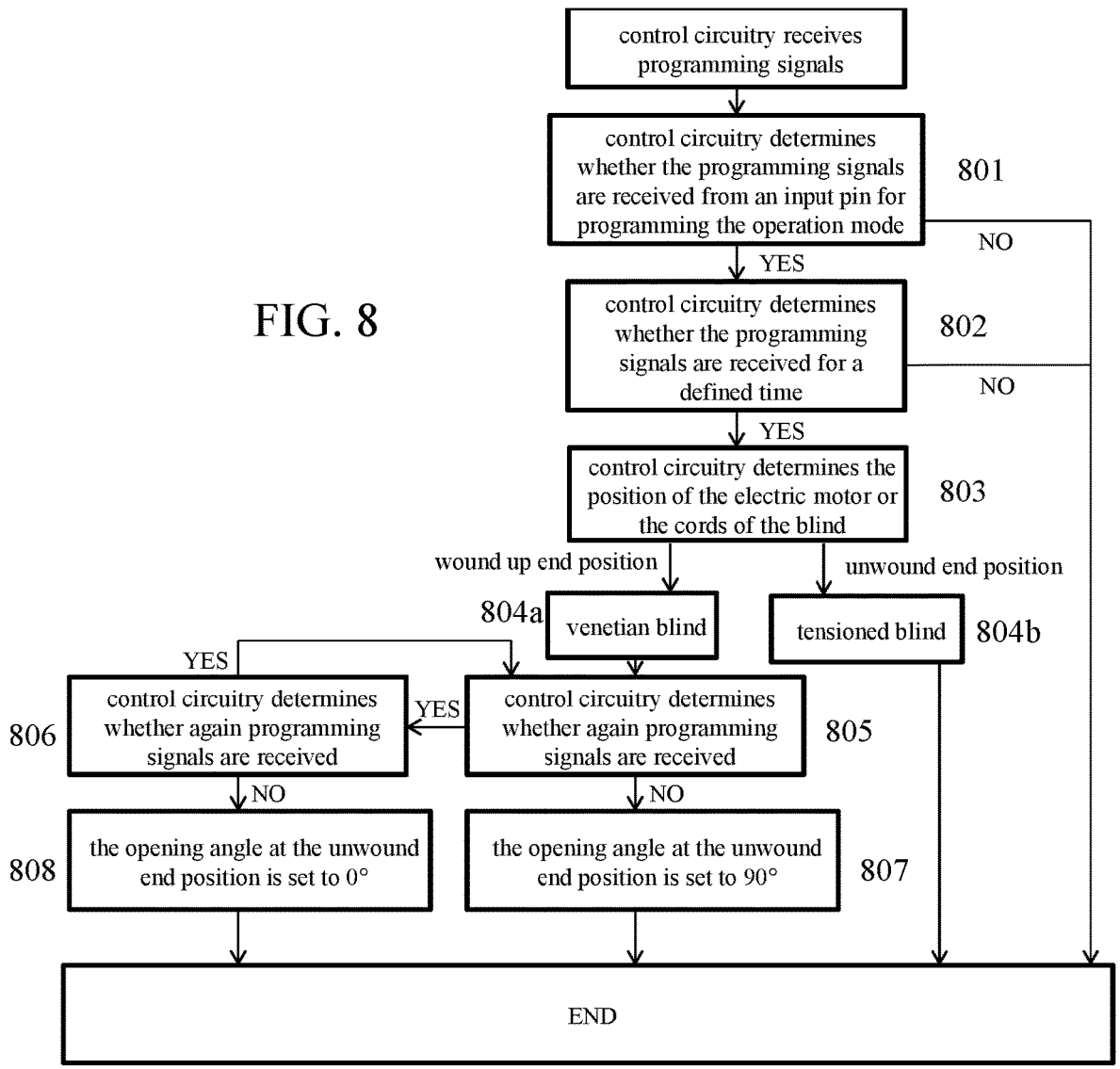

Therefore, the control circuitry 105 is arranged for determining the operation mode on the basis of programming signals received via the programming interface 113 and the position of the cords 102a or electric motor 106 at the time of receiving the programming signals. The determination method performed by the control circuitry 106 when receiving a programming signal for programming the operation mode is schematically shown in FIG. 8. In detail, the control circuitry 105 determines, whether the programming signals are received for a defined time via the input pin 114 for inter alia setting the operation mode (steps 801 and 802) and determines the current position of the cords 102a (step 803).

In case the programming signals are received for a defined time corresponding to a programming of the operation mode via the input pin 114 for inter alia programming the operation mode, the control circuitry 105 determines that the operation mode is to be changed or programmed.

Next, the control circuitry determines the current position of the cords 102a or the electric motor 106. In case the current position corresponds to the unwound end position B, the control circuitry 105 sets the operation mode to "operating a tensioned blind" (step 804b). In case the current position corresponds to the wound up end position A, the control circuitry 105 sets the operation mode to "operating a venetian blind" (step 804a).

Preferably, the operation mode is maintained to be "operating a tensioned blind" or "operating a venetian blind", once the control circuitry 105 is programmed to one of these two operation modes. In such a case, the operation mode may be changed back again to the preferable initial operation mode "operating a free-hanging blind" respectively may be reset to the delivery condition as a result of a factory-reset.

Preferably, the operation mode may also be reset to the delivery condition respectively changed back again to the initial operation mode, preferably the operation mode "operating a free-hanging blind", by the user. For this the user switches the switch 118 from the "OFF" position to the "X" position and then presses the switch 119 for a defined time, preferably six second, while the switch 118 is in the "X" position. This indicates to the control circuitry 105 that the operation mode is reset to the delivery condition. After this the user preferably turns the switch 118 again to the "OFF" position. As a result thereof, the end positions, i.e. the wound up end position A and the unwound end position B, as well as a possibly set intermediate position stored in the storage associated with the control circuitry 205 are preferably deleted. In this regard it is noted that resetting or changing back the operation mode to the delivery condition corresponds to resetting the electric drive unit 104, preferably the control circuitry 105, to the delivery condition.

When programming or setting the operation mode of the control circuitry 105 to the defined operation mode "operating a venetian blind", two predefined settings of the opening angle of the lamellas at the unwound end position B may be programmed, such as e.g. an opening angle of 90° and an opening angle of 0°. A venetian blind with an opening angle of the lamellas of 0° at the unwound end position B, comprises lamellas that are completely closed, i.e. a minimum amount of light can pass through the venetian blind, as the spaces between the single lamellas are closed by the lamellas. A venetian blind with an opening angle of the lamellas of 90° at the unwound position B, comprises lamellas that are completely opened, i.e. a maximum amount of light can pass through the venetian blind, as the spaces between the lamellas are maximally opened.

The user may choose between these two predefined settings of the opening angle of the lamellas by multiply pressing the switch 119 for a defined time, while the switch 118 is in the "X" position and the cords 102a of the blind 103 are in the wound up end position A (steps 804a, 805 and 806). For example, when pressing the switch 119 an even number of times the opening angle of the lamellas at the unwound end position B is 0° (step 808) and when pressing the switch 119 an uneven number of times the opening angle is 90° (step 807).

Programming Wound Up End Position A

For programming the wound up end position A, the user turns the switch 118 from the "OFF" position to the "A" position and presses the switch 119, such that the cords 102a are wounded up and the blind 103 is lifted. When the blind 103 reaches the header panel, the speed of rotation of the electric motor 106 is reduced and the current consumed by the electric motor 106 as well as the torque increase significantly.

The control circuitry 105 determines this reduction of the speed of rotation on the basis of counting the detection pulses received from the rotation detection sensors 108 during time windows of defined length, as described above. In addition, the control circuitry 105 may determine the significant increase of current and torque. In response to determining or detecting the reduction of the speed of rotation of the electric motor 106 and, preferably, the significant increase in current and torque, the control circuitry 105 stops the electric motor 106 and stores the position of the cords 102a at the time of stopping the electric motor 106 as the wound up end position A in the storage associated with the control circuitry 105. At the end the user turns the switch 118 from the "A" position back to the "OFF" position.

Therefore, when the control circuitry 105, preferably the CPU, receives programming signals via the programming interface 113, the control circuitry determines from which pin 114 of the programming interface the programming signals are received. In case the programming signals are received from the pin 114 for programming the wound up end position A, the control circuitry determines that the wound up end position A is to be programmed. The pin 114 for programming the wound up end position A corresponds to the pin 114 that is short-circuited, when the switch 118 is in the "A" position. Thus, when the control circuit determines that the speed of rotation of the electric motor 106 reduces while the cords 102a are winded up, the control circuitry 105 controls the electric motor 106 to stop and programs the position at which the electric motor is stopped as the wound up end position A.

Therefore, the position, at which the blind 103 is completely lifted up, is preferably programmed as the wound up end position A.

Programming Unwound End Position B for First Time

For programming the unwound end position B for the first time, the user turns the switch 118 from the "OFF" position to the "B" position and presses the switch 119, such that the cords 102a are unwound and the blind 103 is lowered to a desired position for the unwound end position B.

When pressing the switch 119, the speed of rotation of the electric motor 106 increases from a lower speed of rotation to a defined speed of rotation for winding/unwinding the cords 102a of the blind 103. In order to drive to a desired position for the unwound end position B at a lower speed of rotation, the pressing of the switch 119 may be interrupted. When the switch 119 is then pressed again, the electric motor 106 rotates again at the lower speed of rotation.

When the desired position is reached, the pressing of the switch 119 is stopped and the user switches the switch 118 from the position "B" back to the position "OFF". As a result thereof, the control circuitry 105 saves the current position of the cords 102a respectively the blind 103, which is the desired position, as the unwound end position B.

When the control circuitry 105, preferably the CPU, receives programming signals via the programming interface 113, the control circuitry determines from which pin 114 of the programming interface the programming signals are received. In case the programming signals are received from the pin 114 for programming the unwound end position B, the control circuitry determines that the unwound end position B is to be programmed. The pin 114 for programming the unwound end position B corresponds to the pin 114 that is short-circuited, when the switch 118 is in the "B" position. Thus, when the desired position is reached and the control circuitry 105 does not receive any more programming signals, as the switch 118 is turned from the position "B" to the position "OFF", the control circuitry stores the current position of the cords 102a as the unwound end position B.

Reprogramming Unwound End Position B

For reprogramming the unwound end position B, the user operates the switch 119 (while the switch 118 is in the "OFF" position"), such that the cords 102a of the blind 103 are unwounded to the (currently set) unwound end position B. That is the electric motor 106 respectively the cords 102a are driven to the unwound end position B. When the electric motor 106 respectively the cords 102a are at the unwound end position B, the user switches the switch 118 from the "OFF" position to the "B" position and then operates the switch 119 (while the switch 118 is in the "B" position), such that the cords 102a of the blind 103 are wounded/unwounded to the desired position for the new unwound end position B.

When the desired position for the new unwound end position B is reached, the operating of the switch 119 is stopped and the user switches the switch 118 from the position "B" back to the position "OFF". As a result thereof, the control circuitry 105 saves the current position of the cords 102a respectively the blind 103, which is the desired position, as the new unwound end position B.

Thus, the control circuitry determines on the basis of the programming signals and the position of the cords 102a at the time of receiving the programming signals the new unwound end position B.

Programming Unwound End Position B for a Tensioned Blind

The above described methods for programming/reprogramming the unwound end position B are preferably performed by the control circuitry 105 when operating in the operation modes "operating a free-hanging blind" and "operating a venetian blind".

When the control circuitry 105 operates in the operation mode "operating a tensioned blind", a slightly different method is performed. In the following references are made with regard to FIG. 7.

Namely, since for a venetian blind the cords 702*a* and the second cords 702*b* are not fixed to the cord winding/unwinding unit 707, but are attached to the cord winding/unwinding unit 707 by friction due to winding or wrapping the cords 702*a* and the second cords 702*b* around the winding shaft of the cord winding/unwinding unit 707 for several times, a slip or slippage is possible.

As a result thereof, an absolute position may not be defined, as the relative position of the cords 702*a* and the second cords 702*b* to the cord winding/unwinding unit 707, especially the winding shaft, may change due to such a slip or slippage.

This problem is relatively small, when the blind 703 reaches the wound up end position A or the header panel, as the cords 702*a* are mostly wound up and, thus, a high friction is present keeping the cords 702*a* and the blind 703 in position. Therefore, the wound up end position A, may be programmed as described above. That is, preferably the wound up end position A is programmed for all three defined operation modes in the same way.

However, when the control circuitry 105 operates in the operation mode "operating a tensioned blind", the following method is performed (references are made with regard to FIG. 1):

For programming the unwound end position B for the first time, the user switches the switch 118 from the "OFF" position to the "B" position and operates then the switch 119, such that the electric motor 106 unwinds the cords 102*a*. When reprogramming the unwound end position B, the user first drives the blind 103 in the set unwound end position B. After having reached the set unwound end position B, the user switches the switch 118 from the "OFF" position to the "B" position and operates then the switch 119, such that the electric motor 106 unwinds the cords 102*a*.

When the blind 103 reaches the unwound end position B/new unwound end position B, the speed of rotation of the electric motor reduces and the current consumed by the electric motor 106 as well as the torque raises significantly. The control circuitry 105 determines or detects this reduction of the speed of rotation and preferably also detects the significant increase of current and/or torque. As a result thereof, the control circuitry 105 stops the electric motor 106 and saves the position of the cords 102*a* or the blind 103 at the time of stopping the electric motor 106 as the unwound end position B/new unwound end position B.

Therefore, the electric drive unit 104, preferably the control circuitry 105 determines a parameter of the control circuitry 105 or electric motor 106, such as e.g. the unwound end position B, on the basis of the programming signals received at the programming interface 113, the operation mode set at the time of receiving the programming signals, and the position of the cords 102*a* or electric motor 106 at the time of receiving the programming signals.

Programming the Opening Angle of the Lamellas of a Venetian Blind at the Unwound End Position B According to the invention, the opening angle of the lamellas of a venetian blind being unwound at the unwound end position B may be programmed. Thus, when the venetian blind is fully closed respectively lowered, i.e. the cords 102*a* are unwound to the unwound end position B, an opening angle of the lamellas may be programmed so that still light can pass through the openings between the lamellas. The amount of light passing through the venetian blind depends on the opening angle. In case of an opening angle of 0°, no light passes through, as the lamellas are turned such that the openings between the lamellas are closed. In case of an opening angle of 90°, a maximum amount of light may pass through, as the lamellas are turned such that the openings between the lamellas are not closed by the lamellas.

For programming the opening angle, the user turns the switch 118 from the position "OFF" to the position "X" and operates then the switch 119, while the switch 118 is in the position "X", for setting the opening value. For example the opening angle of the lamellas may be programmed through pressing the switch 119 for a defined time period and/or pressing the switch 119 for a defined number of times. Thus, e.g. different time periods may correspond to different opening angles.

Unwinding a Tensioned Blind to the Unwound End Position □

When a tensioned blind is unwounded to the end position B, the control circuitry may control the electric motor 106, such that electric motor 106 drives the cord winding/unwinding unit to unwind the cords 102*a* and to wind up the second cords 102*b* (not shown in FIG. 1). The control circuitry 106 controls the electric motor 106 to stop rotating, in case the control circuitry 106 detects or determines a defined reduction of the speed of rotation of the electric motor 106. Preferably, the control circuitry 106 may also control the electric motor 106 to stop rotating, in case of detecting a defined increase of the current of the electric motor 106. Moreover the control circuitry 105 controls the electric motor 106 to stop rotating, in case the electric motor 106 or the cords 102*a* reach an overvalue position OV (not shown in FIG. 1, but in FIG. 7), which is a defined distance, such as e.g. 10 cm, below the unwound end position B. That is, the overvalue position OV is a defined distance, in the direction of the unwinding, away from the unwound end position B.

Preferably, in case the control circuitry 105 determines or detects the defined reduction of the speed of rotation of the electric motor 106 and/or, preferably, the defined increase of the current of the electric motor 106 before the electric motor 106 or the cords 102*a* reach the unwound end position B or the defined overvalue position OV, the control circuitry 105 sets the position, at which the defined reduction of the speed of rotation and/or the defined increase of the current is determined, as the new unwound end position B.

The control circuitry might determine a defined reduction of the speed of rotation and/or a defined increase of the current before reaching the unwound end position B or the overvalue position, as a result of an obstacle being present. For example this could be a plant pot on a windowsill that prevents the blind 103 from further lowering.

According to the present invention, the control circuitry 105 controls the electric motor 106 on the basis of determining or detecting the speed of rotation of the electric motor 106. A control on the basis of the current consumed or taken up by the electric motor may be implemented as an additional feature.

Winding a Tensioned Blind Up to the Wound Up End Position □

Preferably, the above control scheme can also be performed when the cord winding/unwinding unit 107 winds the cords 102*a* of the blind 103 being a tensioned blind up to the wound up end position A. In this case, the control circuitry 105 controls the electric motor 106 to stop rotating, in case the control circuitry 106 detects or determines a defined reduction of the speed of rotation of the electric motor 106. Preferably, the control circuitry 106 may also control the electric motor 106 to stop rotating, in case of detecting a defined increase of the current of the electric motor 106. Moreover the control circuitry 105 controls the electric motor 106 to stop rotating, in case the electric motor 106 or the cords 102a reach an overvalue position OV2, which is a defined distance, such as e.g. 15 cm, above the wound up position A. That is, the overvalue position OV2 is a defined distance, in the direction of the winding up, away from the wound up end position A.

Furthermore, as mentioned already above, the control circuitry 105 may also control the electric motor 106, such that the electric motor 106 stops rotating after a defined time, such as e.g. 3 minutes. That is, in case the cords 102a neither reach the wound up end position A nor the overvalue position OV2 after a defined time, such as e.g. 3 minutes, the control circuitry 105 controls the electric motor 106 to stop rotating.

Preferably, in case the control circuitry 105 determines or detects the defined reduction of the speed of rotation of the electric motor 106 and/or, preferably, the defined increase of the current of the electric motor 106 before the electric motor 106 or the cords 102a reach the wound up end position A or the defined overvalue position OV2, the control circuitry 105 sets the position, at which the defined reduction of the speed of rotation and/or the defined increase of the current is determined, as the new wound up end position A.

According to the present invention, the control circuitry 105 controls the electric motor 106 on the basis of determining or detecting the speed of rotation of the electric motor 106. A control on the basis of the current consumed or taken up by the electric motor may be implemented as an additional feature.

Determining an Obstacle when Winding Up a Free-Hanging Blind or a Venetian Blind When the control circuitry 105 operates in the "operating a free-hanging blind" operation mode or the "operating a venetian blind" operation mode, the control circuitry 105 may detect an obstacle, when winding up the blind 103 being a free-hanging blind or a venetian blind. In case the control circuitry 105 detects or determines that an obstacle is present, it stops the electric motor 106 rotating and, thus, stops the cord winding/unwinding unit winding the cords 102a of the blind 103 up.

The control circuitry 105 determines that an obstacle is present, in case the control circuitry 105 determines or detects a defined reduction of the speed of rotation of the electric motor 106 and/or a defined increase of the current of the electric motor 106. As a result thereof, the control circuitry 105 controls the electric motor 106 to stop rotating.

Relaxing the Blind after Reaching the Wound Up End Position A

As already described above with regard to FIG. 6a, after the cords 102a or the blind 103 has reached the wound up end position A, the control circuitry 105 may control the electric motor 106 to shortly rotate or turn in the opposite direction compared with the direction of rotation for winding the cords 102a up, in order to relax the cords 102a and the blind 103.

Such a relaxation of the cords 102a and the blind 103 may preferably also be performed after the control circuitry 105 has controlled the electric motor 106 to stop rotating in response to determining or detecting an obstacle.

For free-hanging blinds and venetian blinds, the cords 102a and the blind 103 are always relaxed by the same relaxation value, i.e. the electric motor 106 rotates or turns in the opposite direction for the same short time period.

Preferably, for tensioned-blinds, the cords 102a and the blind 103 are relaxed by a relaxation value depending on the total length of the blind 103. That is the time period for which the electric motor 106 rotates in the opposite direction depends on the total length of the blind 103.

The dependency on the length may be implemented as a percentage value or different relaxation categories.

Tensioned-blinds are often used in environments with a certain humidity. A sticking together of the several segments, such as e.g. the pleating-folds, of the blind 103 in the wound up end position A due to the interaction of high temperature, humidity etc. may be prevented as a result of relaxing the blind 103 with a relaxation value depending on the total length of the blind 103. Namely, due to the relaxation after reaching the wound up end position A, the single segments of the blind 103 are detached or disengaged again from each other. When reaching the wound up end position A, the single segments of the blind 103 are stacked together, like a package.

Furthermore, as a result of the relaxation a drying of the blind 103 may be achieved due to a good air circulation or ventilation.

Reprogramming of the Unwound End Position B Using the Programming Key

As mentioned already above, the programming key may be used by a user to reprogram the unwound end position B.

For this, the user operates the operation unit 112, such that the electric drive unit 104 unwinds in the normal operation state the cords 102a of the blind 103 to the unwound end position B. In detail, the control circuitry 105, preferably the CPU, controls the electric motor 106 to rotate such, that the cord winding/unwinding unit unwinds the cords 102a of the blind 103 to the unwound end position B.

When the cords 102a respectively the blind 103 is at the unwound end position B, the user connects the programming key 120 to the programming interface 113, which short-circuits the input pin 114 for programming the unwound end position B. Next, the user operates the operation unit 112 in order to drive the cords 102a or the blind 103 to the new desired unwound end position B. After the cords 102a respectively the blind 103 is at the desired position for the new unwound end position B, the user disconnects the programming key 120. As a result thereof, the control circuitry stores the position at which the programming key is disconnected as the new unwound end position B in the storage associated with the control circuitry 105.

Programming of an Intermediate Position Using the Programming Key

Furthermore, the programming key may be used by a user to program an intermediate position. Preferably, an intermediate position is programmed for venetian blinds, wherein the electric motor 106, operating a venetian-blind, stops at the intermediate position, in order to rotate for a defined time in the opposite direction compared with the direction of rotation before the stop, such that the lamellas are opened to a defined opening angle. The opening angle may be set by the defined time, for which the electric motor rotates in the opposite direction.

For programming the intermediate position, the user operates the operation unit 112, such that the electric drive unit 104 drives, i.e. wind/unwinds, in the normal operation state the cords 102a of the blind 103 to the desired intermediate position. In detail, the control circuitry 105, preferably the CPU, controls the electric motor 106 to rotate such, that the cord winding/unwinding unit winds/unwinds the cords 102*a* of the blind 103 to the desired intermediate position.

When the cords 102*a* respectively the blind 103 is at the desired intermediate position, the user connects the programming key 120 to the programming interface 113, which short-circuits the input pin 114 for programming the unwound end position B. Next, the user presses the switch of the operation unit 112 for a defined time, preferably one second, and then disconnects the programming key 120. As a result thereof, the control circuitry stores the position at which the programming key is disconnected as the intermediate position in the storage associated with the control circuitry 105.

Deleting an Intermediate Position Using the Programming Key

In order to delete an intermediate position, the user operates the operation unit, such that the electric drive unit 104 winds up in the normal operation state the cords 102*a* of the blind 103 to the wound up end position A. In detail, the control circuitry 105, preferably the CPU, controls the electric motor 106 to rotate such that the cord winding/unwinding unit winds up the cords 102*a* of the blind 103 to the wound up end position A.

When the cords 102*a* respectively the blind 103 is at the wound up end position A, the user connects the programming key 120 to the programming interface 113, which short-circuits the input pin 114 for programming the unwound end position B. Next, the user presses the switch of the operation unit 112 for a defined time, preferably one second, and then disconnects the programming key 120. As a result thereof, the control circuitry deletes the intermediate position stored in the storage associated with the control circuitry 105.

Programming with the Programming Key

As described above, when the programming key is connected to the programming interface 113 and the control circuitry 105 receives signals from the operation unit 112, the control circuitry 115 determines the position of the cords 102*a* at the time of receiving the signals and determines the time for which it receives a certain signal.

In case the control circuitry 105 determines that the position at the time of receiving the signals from the operation unit 112 corresponds to the unwound end position B, the control unit knows that a new unwound end position is being programmed. Thus, when the programming key 120 is disconnected, the control circuitry stores the position of the cords 102*a* or the electric motor 106 at the time of disconnection as the new unwound end position B.

In case the control circuitry 105 determines that the position at the time of receiving the signals from the operation unit 112 corresponds to a position between the wound up end position A and the unwound end position B and the signals are received for a defined time, preferably one second, the control unit knows that an intermediate position is being programmed. Thus, when the programming key 120 is disconnected, the control circuitry stores the position of the cords 102*a* or the electric motor 106 at the time of disconnection as an intermediate position.

In case the control circuitry 105 determines that the position at the time of receiving the signals from the operation unit 112 corresponds to the wound up end position A and the signals are received for a defined time, preferably one second, the control unit knows that an intermediate position is being deleted. Thus, when the programming key 120 is disconnected, the control circuitry deletes the intermediate position stored in the storage associated with the control circuitry 105.

What is claimed is:

1. An architectural covering system comprising:
   a blind;
   an electric motor; and
   a controller coupled with the electric motor and configured to control operations of the electric motor to at least:
   wind the blind in a first direction;
   stop winding the blind in the first direction at a programmatically adjustable wound end position; and
   upon the blind reaching the programmatically adjustable wound end position, wind the blind in an opposite direction to a second position relaxing at least a cord of the blind that is wound by a cord winding/unwinding unit driven by the electric motor, the difference between the programmatically adjustable wound end position and the second position being an amount less than that which would result in movement of the blind to a fully extended position and set based on a length of the blind.

2. The architectural covering system of claim 1, further comprising:
   wherein winding the blind in the first direction comprises driving the cord winding/unwinding unit to wind up at least the cord of the blind, and wherein winding the blind in the opposite direction comprises driving the cord winding/unwinding unit to turn in the opposite direction by the amount to relax at least the cord.

3. The architectural covering system of claim 1, further comprising:
   a first rotation detection sensor coupled with the controller and configured to detect increments of a rotation of the electric motor based on a rotating element driven by the electric motor, and wherein the controller is further configured to determine a position of the blind based on sensor data indicating the increments of the rotation.

4. The architectural covering system of claim 3, further comprising:
   a second rotation detection sensor coupled with the controller, and wherein the controller is further configured to determine a direction of the rotation based on a phase shift of detection pulses of at least the first rotation detection sensor and the second rotation detection sensor.

5. The architectural covering system of claim 3, wherein the sensor data comprises detection pulses, wherein the second position is a defined number of detection pulses away from the programmatically adjustable wound end position.

6. The architectural covering system of claim 1, wherein the controller is further configured to detect a speed of a rotation of the electric motor over time and to stop the operations of the electric motor based on a defined reduction of the speed.

7. The architectural covering system of claim 1, wherein controlling the operations of the electric motor to stop the winding of the blind in the first direction comprises causing the electric motor to:
   accelerate from a rest position to a first speed;
   drive the blind at the first speed for a defined time period;
   accelerate, after the defined time period, to a second speed; and drive the blind at the second speed until the controller controls the electric motor to stop the winding in the first direction.

8. The architectural covering system of claim 1, wherein the controller is configured to stop the winding of the blind in the first direction based on determining a speed of rotation of the electric motor reached a reduced value, or determining that the electric motor has reached an overvalue position that is a defined distance in the first direction from the programmatically adjustable wound end position.

9. The architectural covering system of claim 1, wherein the controller is further configured to store the programmatically adjustable wound end position by at least:
- controlling the electric motor to rotate;
- determining a speed of rotation of the electric motor over time;
- determining a reduction to the speed; and
- responsive to determining that the reduction corresponds to a defined reduction:
  - determine a current position of the blind at which the reduction is determined to correspond to the defined reduction; and
  - storing the current position as the programmatically adjustable wound end position.

10. A method for controlling an architectural covering, the method comprising:
- winding, by using an electric motor of the architectural covering, a blind of the architectural covering in a first direction;
- stopping the winding by the electric motor of the blind in the first direction at a programmatically adjustable wound end position; and
- upon the blind reaching the programmatically adjustable wound end position, winding, by using the electric motor, the blind in an opposite direction to a second position relaxing at least a cord of the blind that is wound by a cord winding/unwinding unit driven by the electric motor, the difference between the programmatically adjustable wound end position and the second position being an amount less than that which would result in movement of the blind to a fully extended position and set based on a length of the blind.

11. The method of claim 10, further comprising:
prior to winding the blind in the first direction:
- receiving sensor data from a set of sensors of the architectural covering, wherein the sensor data indicates detection pulses of a set of rotating elements coupled with the electric motor;
- maintaining a count of the detection pulses; and
- determining a current position of the blind based on the count.

12. The method of claim 11, further comprising:
during the winding of the blind in the first direction:
- receiving additional sensor data from the set of sensors;
- updating the count based on the additional sensor data;
- determining that the count is updated to a defined value, wherein the defined value corresponds to the programmatically adjustable wound end position; and
- determining that the blind reached the programmatically adjustable wound end position.

13. The method of claim 10, wherein the second position is set based on a blind type.

14. The method of claim 11, further comprising:
during the winding of the blind in the opposite direction:
- receiving additional sensor data from the set of sensors;
- updating the count based on the additional sensor data;
- determining that the count is updated to a defined number of detection pulses, the defined number corresponding to the second position; and
- stopping the winding of the blind in the opposite direction.

15. The method of claim 10, wherein the second position is set based on a relaxation category.

16. A controller of an architectural covering, the controller comprising:
- one or more processors; and
- one or more memories storing instructions that, upon execution by the one or more processors, configure the controller to control operations of an electric motor of the architectural covering to at least:
  - wind a blind of the architectural covering in a first direction;
  - stop winding the blind in the first direction at a programmatically adjustable wound end position; and
  - upon the blind reaching the programmatically adjustable wound end position, wind the blind in an opposite direction to a second position relaxing at least a cord of the blind that is wound by a cord winding/unwinding unit driven by the electric motor, the difference between the programmatically adjustable wound end position and the second position being an amount less than that which would result in movement of the blind to a fully extended position and set based on a length of the blind.

17. The controller of claim 16, wherein the one or more memories store additional instructions that, upon execution by the one or more processors, configure the controller to:
- determine that a programmed mode is requested based on signals from an input device; and
- control additional operations of the electric motor to wind up the blind;
- detect at least one of: a speed of rotation, a current, or a torque of the electric motor;
- detect that the blind reached a wound up position based on the at least one of the speed, current, or torque; and
- store the wound up position as the programmatically adjustable wound end position.

18. The controller of claim 17, wherein the signals are received via a first set of pins, and wherein the additional operations of the electric motor are controlled based on second signals received via a second set of pins from the input device.

19. The controller of claim 17, wherein the signals are received via a first set of pins that are associated with programming the programmatically adjustable wound end position to change.

20. The controller of claim 16, wherein the one or more memories store additional instructions that, upon execution by the one or more processors, configure the controller to:
- determine that a programmed mode is requested based on first signals from an input device;
- control additional operations of the electric motor to wind down the blind;
- receive second signals from the input device;
- detect a current position of the blind; and
- store the current position as a defined wound down end position.

* * * * *